(12) United States Patent
Flowers et al.

(10) Patent No.: US 6,530,445 B1
(45) Date of Patent: Mar. 11, 2003

(54) VARIABLE WHEELBASE PERSONAL MOBILITY VEHICLE

(75) Inventors: Michael J. Flowers, Mantua, NJ (US); Edward J. Hanker, Jr., Mullica Hill, NJ (US); Edward J. Dwyer, Jr., Pittsgrove, NJ (US); Lou Madonia, Mullica Hill, NJ (US); Mark J. Hoskin, Mars Landing, NJ (US); Hugh C. McCall, Wenonah, NJ (US); Stephen Jarema, III, Newfield, NJ (US)

(73) Assignee: Electric Mobility Corporation, Sewell, NJ (US)

( * ) Notice: Subject to any disclaimer, the term of this patent is extended or adjusted under 35 U.S.C. 154(b) by 0 days.

(21) Appl. No.: 09/853,502

(22) Filed: May 11, 2001

Related U.S. Application Data

(60) Provisional application No. 60/203,857, filed on May 12, 2000.

(51) Int. Cl.[7] ............................ A61G 5/04; B62D 61/00
(52) U.S. Cl. ...................... 180/208; 180/209; 180/216; 180/907; 280/638; 280/149.2
(58) Field of Search ................................ 180/209, 208, 180/215, 216, 217, 907; 280/638, 149.2

(56) References Cited

U.S. PATENT DOCUMENTS

| 3,664,450 A | 5/1972 | Udden et al. |
|---|---|---|
| 3,945,449 A | 3/1976 | Ostrow |
| 4,351,540 A | 9/1982 | Minnebraker |
| 4,452,327 A | 6/1984 | Mowat et al. |
| 4,613,151 A | 9/1986 | Kielczewski |
| 4,721,321 A | 1/1988 | Haury et al. |
| 4,805,925 A | 2/1989 | Haury et al. |
| 4,834,409 A | 5/1989 | Kramer |
| 4,909,525 A | 3/1990 | Flowers |
| RE33,675 E | 8/1991 | Young |
| 5,094,310 A | 3/1992 | Richey et al. |
| 5,826,670 A | 10/1998 | Nan |
| 5,848,658 A | 12/1998 | Pulver |
| 5,996,716 A | 12/1999 | Montiglio et al. |
| 6,273,206 B1 | 8/2001 | Bussinger |

FOREIGN PATENT DOCUMENTS

GB      2 201 588 A   *   9/1988

\* cited by examiner

*Primary Examiner*—Peter C. English
(74) *Attorney, Agent, or Firm*—Frijouf, Rust & Pyler, P.A.

(57) ABSTRACT

A variable wheelbase personal mobility vehicle is disclosed comprising a front wheel assembly and a rear wheel assembly. A front wheel is pivotably mounted relative to the front wheel assembly for controlling the direction of movement of the personal mobility vehicle. Plural drive wheels are mounted relative to the rear wheel assembly for driving the personal mobility vehicle. A seat is connected to the rear wheel assembly for supporting an operator. A variable wheelbase mechanism varies the distance between the front wheel and the plural drive wheels.

12 Claims, 15 Drawing Sheets

VARIABLE WHEELBASE PERSONAL MOBILITY VEHICLE

CROSS-REFERENCE TO RELATED APPLICATIONS

This application claims benefit of U.S. Provisional application No. 60/203,857 filed May 12, 2000. All subject matter set forth in provisional application No. 60/203,857 is hereby incorporated by reference into the present application as if fully set forth herein.

BACKGROUND OF THE INVENTION

1. Field of the Invention

This invention relates to personal mobility vehicles and more particularly to a personal mobility vehicle having a variable wheelbase.

2. Background of the Related Art

The popularity of personal mobility vehicles has dramatically increased over the last serveral decades. This increase in the popularity of personal mobility vehicles is due to many factors including the advent of new structural techniques and materials, as well as a more aging population. Although the population especially in the United States of America is moving towards a more senior age distribution, many of these seniors are very active and mobile. This desire for mobility and activity is present despite physical or health infirmities.

Various types of personal mobility vehicles have been designed and sold in the prior art for different types of applications and activities. When a personal mobility vehicle is used indoor or in confined spaces, the personal mobility vehicle is typically designed with a short wheelbase. The short wheelbase provides a reduced turning radius for the personal mobility vehicle for negotiating smaller confined spaces indoors.

When a personal mobility vehicle is to be used outdoors, a longer wheelbase is desirable. The longer wheelbase provides more stability and a better ride for the personal mobility vehicle.

Some in the prior art have attempted to develop a variable wheelbase personal mobility vehicle for use in both confined spaces and in non-confined spaces. The following U.S. patents are representative of some of the attempts of the prior art to provide a variable wheelbase personal mobility vehicle.

U.S. Pat. No. Re. 33,675 to Young discloses a motorized wheel chair comprising a chassis having two rear wheels and one front wheel mounted thereon. The front wheel is steerable by a handlebar. The rear wheels are driven by an electric motor coupled to a gearbox, for reducing the speed of the wheel chair. The gearbox drives a friction drive assembly that is engageable with the rear wheels and also is coupled to the handlebar such that one of the rear wheels will be disengaged depending upon which direction the handlebar is turned. The device is provided with a switch that cuts power to the device when a change in surface elevation of a desired amount is detected either in front of or behind the device. A second switch may be provided to stop the vehicle upon contact with a foreign object. A third switch may be activated remotely to stop the device. Also, the chassis is adjustable in length, such that as a child grows the device may be adjusted accordingly.

U.S. Pat. No. 3,664,450 to Udden et al. discloses that electrically powered four-wheeled single vehicles especially for disabled persons and invalids and specifically made for out-door use must have such stabilizing qualities that under all circumstances there is no risk for the chair to turn over even if it will have to pass over different kinds of obstacles such as curbs. A further object of such vehicles is to provide a simple and safe steering operation so that the forces from the obstacles to be passed over must not he transmitted to the steering handle, since patients in many cases have considerably reduced power to control such forces by hand. These objects are realized in the invention substantially by the fact that the vehicle comprises a rear and a front portion which are swingably connected to each other by means of telescopic pipes or the like running substantially in parallel with the ground and in the longitudinal direction of the vehicle. To meet the requirement of a safe and unaffected steering operation the front wheels are neutrally positioned in a way that the extension of the swivel axles will cut the contact surfaces between the corresponding wheels and the ground.

U.S. Pat. No. 3,945,449 to Ostrow discloses a generally rectangular shaped support frame provided with ground-engaging wheels upon which almost any type and size of conventional chair may be readily mounted so as to provide mobile means for transporting non-ambulatory persons. Certain of the ground engaging wheels are capable of being rotated manually by the person using the converted wheel chair in order to propel the chair in two embodiments of the invention, electrically in a third embodiment and selectively manually or electrically or both manually and electrically in a fourth embodiment thereof. A retractable foot rest is also incorporated in the support frame.

U.S. Pat. No. 4,351,540 to Minnebraker discloses a wheelchair capable of being constructed in several different sizes from components of standard size in order to permit users of different sizes and users with one or more handicaps to utilize such wheelchairs. The wheelchair includes a main frame and a foot support assembly which can be telescopically adjustably affixed to the main frame. In addition, a seat section can be telescopically adjustably affixed to the main frame such that the seat is located at a selected height and the foot support section can extend outwardly from the frame for a selected distance to accommodate users of differing height. The rear wheels are mounted with respect to the main frame such that the rear wheels can be located in several different positions in order to change the overall center of gravity and the wheelbase of the wheelchair. In this way, the wheelchair can be used for conventional wheelchair movement, as well as for athletic activities. A pair of front wheels are also adjustably mounted with respect to the main frame in order to change the angle of the wheelchair and the seat relative to the ground or other supporting surface.

U.S. Pat. No. 4,452,327 to Mowat et al. discloses a connecting assembly for a light weight vehicle having mutually engaging hook and latch portions. The hook portion comprises engaging hooks to engage and lift the latch means. The engaging portion further includes a shoulder to cause the subsequent disengagement of the latch and engaging portions. Support hooks receive the latch portion upon its disengagement from the engagement hooks. A levered handle causes displacement of the latch portion from the support hooks.

U.S. Pat. No. 4,613,151 to Kielczewski discloses an improved wheelchair adapted to provide enhanced mobility for the occupant together with making ground level activities available. The wheelchair comprises a main frame together with an extension frame telescopically secured to the main frame. A seat is secured to the extension frame so that when the extension frame is moved away from the main frame, the seat is lowered, and when the extension frame is brought back to the main frame, the seat is raised. Means are provided for further enhancing stability in the form of a mechanism to selectively move the drive wheels apart for wider wheel tracking. A rear wheel caster is provided with a selectively operable torsion limiter.

U.S. Pat. No. 4,721,321 to Haury et al. discloses a sports wheelchair including a frame portion having left and right side frame portions. Rear wheel assemblies are connected with the left and right side frame portions such that the rear wheels are connectable to the frame in any one of a plurality of positions and with an adjustable camber. A pair of front wheel assemblies selectively interconnect the front wheels with the frame with any one of a plurality of adjustable heights and positions. An operator supporting seat having a segmented center portion and an outer portion is selectively interconnected with the left and right side frame portions. A folding mechanism enables the left and right side frame portions to be folded together for easier transportation and storage.

U.S. Pat. No. 4,805,925 to Haury et al. discloses a sports wheelchair including a frame portion having left and right side frame portions. Rear wheel assemblies are connected with the left and right side frame portions such that the rear wheels are connectable to the frame in any one of a plurality of positions and with an adjustable camber. A pair of front wheel assemblies selectively interconnect front wheels with the frame with any one of a plurality of adjustable heights and positions. An operator supporting seat having a segmented center portion and an outer portion is selectively interconnected with the left and right side frame portions. A folding mechanism enables the left and right side frame portions to be folded together for easier transportation and storage.

U.S. Pat. No. 4,834,409 to Kramer discloses a personal mobility vehicle main frame unit with front and back ends, both with wheels thereon, a steerable front wheel, a seat and vehicle controls. A pair of spaced rear wheels are mounted at the back end of the vehicle and include moveably mounted axles supporting the rear wheels and connected to arms with mechanisms for selectively angularly moving the axles outwardly and inwardly of the main frame unit to vary wheel base and wheel track. A motor is connected to the wheel support structure for remotely varying the wheel base and wheel track. A separate drive motor is operatively connected to the wheels for movement of the vehicle.

U.S. Pat. No. 4,909,525 to Flowers discloses a personal mobility vehicle comprising front and rear frame sections that can be disassembled and assembled. The frame sections are secured together by a pivotable detachable connection such that the rear frame section is lockingly received in the rear portion of the front frame section and the length of the assembled frame is substantially the same as the length of the front frame section itself. An auxiliary frame section is also provided which can be readily attached to the powered rear frame section to provide improved mobility in those situations in which space for turning is limited.

U.S. Pat. No. 5,094,310 to Richey et al. discloses a powered wheelchair including a high efficiency drive mechanism for increasing the range of travel on a predetermined battery charge. Drive motors are transversely mounted relative to side frames of the wheelchair, and disposed in superimposed arrangement for varying the width of the wheelchair.

U.S. Pat. No. 5,826,670 to Nan discloses a detachable propulsive device for a wheelchair including a longitudinal skeleton frame, a driving unit attached to the front of the skeleton frame, a handle for steering the propulsive device, dimensions adjusting unit, and auxiliary wheels. The dimensions adjusting unit carries four retaining clips and allows to adjust distances between these clips lengthwise and widthwise, so that the clips are capable of engaging and holding side members of the bottom frame of the wheelchair of any desired length and width. The length adjusting mechanism of the dimensions adjusting unit includes a system of telescopically movable hollow tubes with U-shaped cross sliding rails secured to them, while the width adjusting mechanism include s sliding arms carrying the retaining clips on their outer ends and sliding longitudinally along the U-shaped cross sliding rails in the lateral direction. The auxiliary wheels at the rear of the propulsive device are lifted from the ground once the device has been attached to the wheelchair.

U.S. Pat. No. 5,848,658 to Pulver discloses a mid-wheel drive or front wheel drive power wheelchair including a front stabilizer extending from the frame. It includes a first arm pivotally mounted to the frame at a first or upper end and a stabilizer wheel is mounted adjacent a second end. A second arm of the stabilizer assembly is pivotally interconnected between the stabilizer wheel axis and lower end of the shock assembly associated with the suspension arm. The first arm includes a dampening cylinder surrounded by a spring. The spring force preload can be selectively altered and, independently, the height of the stabilizer wheel may be adjusted.

U.S. Pat. No. 5,996,716 to Montiglio et al. discloses a new wheelchair that is adjustable in length, width and height in order to be adapted to different users of different sizes or to a child growing up. The wheelchair comprises T-shaped front and rear frames and a seat assembly. Each T-shaped frame is made of a long arm and two short arms. The rear frame and the front frame are telescopically connected together in such a manner so as to articulate both frames together and to adjust the distance between the front and rear wheels. The two rear wheels are adjustably mounted to the rear frame so that the distance separating the wheels may be adjusted. The seat assembly is mounted on the rear frame and is adjustable in height. The front wheels are mounted on the front frame at each end of the two short arms.

Therefore it is an object of this invention to provide a variable wheelbase personal mobility vehicle that overcomes the inadequacies of the prior art and provides a significant advancement to the personal mobility vehicle art.

Another object of this invention is to provide an improved variable wheelbase personal mobility vehicle capable of varying the wheelbase of the personal mobility vehicle with a variable wheelbase drive mechanism.

Another object of this invention is to provide an improved variable wheelbase personal mobility vehicle that is adaptable to either three wheel or four wheel personal mobility vehicles.

Another object of this invention is to provide an improved variable wheelbase personal mobility vehicle that does not substantially increase the weight of the personal mobility vehicle.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a variable wheelbase personal mobility vehicle comprising a front wheel assembly and a rear wheel assembly. A front wheel is pivotably mounted relative to the front wheel assembly for controlling the direction of movement of the personal mobility vehicle. Plural drive wheels are mounted relative to the rear wheel assembly for driving the personal mobility vehicle. A seat is connected to the rear frame section for supporting an operator. A variable wheelbase mechanism varies the distance between the front wheel and the plural drive wheels.

In a more specific embodiment of the invention, the front wheel comprises plural front wheels pivotably mounted relative to the front wheel assembly for controlling the direction of movement of the personal mobility vehicle.

In one embodiment of the invention, the variable wheelbase mechanism includes a lock for locking the distance between the front wheel and the plural drive wheels with the lock in a closed condition. The lock enables the distance between the front wheel and the plural drive wheels to be varied with the lock in an open condition.

In another embodiment of the invention, the variable wheelbase mechanism includes a variable wheelbase drive for moving the front wheel relative to the plural rear wheels for changing the wheelbase of the personal mobility vehicle. In one specific example, the variable wheelbase drive comprises a linear actuator. In another specific example, the variable wheelbase drive comprises a jackscrew. In still another specific example, the variable wheelbase drive comprises a scissors jack. In still another specific example, the variable wheelbase drive comprises a rack and pinion mechanism.

In another embodiment of the invention, the variable wheelbase mechanism comprises a slide mechanism for varying the distance between the front wheel and the plurality of rear drive wheels. In one specific example, a slide mechanism interconnects the front wheel assembly to the rear wheel assembly for varying the distance between the front wheel and the plurality of rear drive wheels. In another specific example, the variable wheelbase mechanism comprises a shaft mounted relative either the front or the rear wheel assembly and a shaft receiver mounted relative to the other of the front and rear wheel assembly. The shaft slidably cooperates with the shaft receiver for moving: the front wheel assembly relative to the rear wheel assembly.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
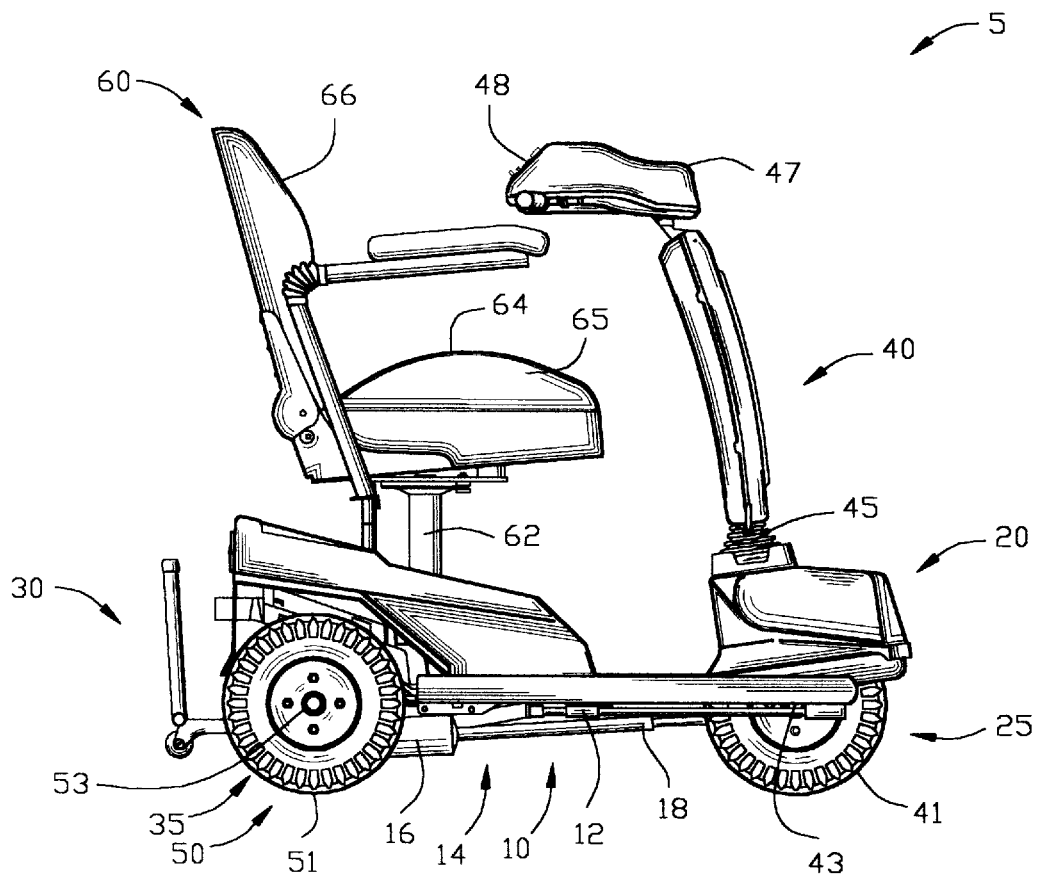
FIG. 1 is a side elevational view of a first embodiment of a variable wheelbase personal mobility vehicle incorporating the present invention with the variable wheelbase being positioned in a contracted position.
Figure 2:
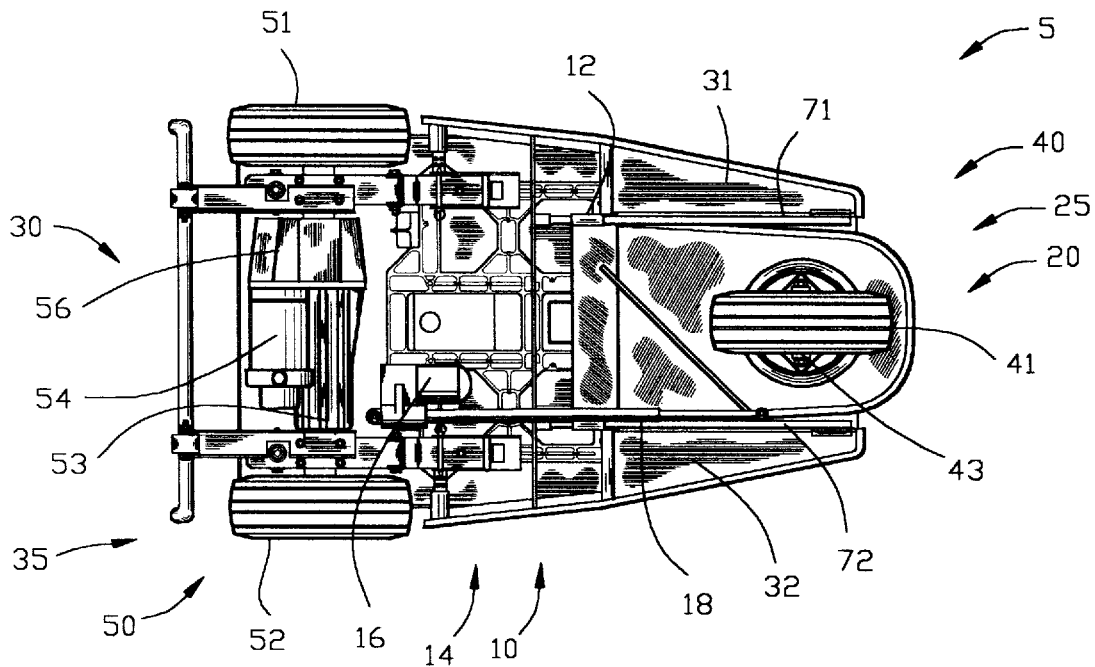
FIG. 2 is a bottom view of FIG. 1.

FIGS. 1 and 2 are side and bottom views of a first embodiment of a personal mobility vehicle 5 incorporating a variable wheelbase mechanism 10 of the present invention. The variable wheelbase mechanism 10 enables the wheelbase of the personal mobility vehicle 5 to be varied in accordance with the location and condition of the immediate environment.

The variable wheelbase personal mobility vehicle 5 comprises a front frame section 20 and the rear frame section 30. The front frame section 20 comprises a front wheel assembly 25 whereas the rear frame section 30 comprises a rear wheel assembly 35. In this embodiment of the invention, the variable wheelbase mechanism 10 interconnects the front wheel assembly 25 to the rear wheel assembly 35.

A steering mechanism 40 is connected to the front wheel assembly 25. The steering mechanism 40 comprises a front wheel 41 mounted on an axle 43. The front axle 43 is pivotably mounted relative to the front wheel 41 by a pivot 45. A tiller 47 is connected to the pivot 45 for enabling an operator to pivot the front wheel 41. A movement of the tiller 47 by an operator causes movement of the front wheel 41 to alter the direction of the personal mobility vehicle 5. Control switches 48 are conveniently located on the tiller 47 for enabling an operator to control the speed and the rotational direction of the personal mobility vehicle 5.

A drive unit 50 is connected to the rear wheel assembly 35. The drive unit 50 comprises plural drive wheels 51 and 52 mounted on a drive shaft 53. An electric drive motor 54 is connected through a gearbox 56 for driving the plural drive wheels 51 and 52 through the drive shaft 53 and the gearbox 56. The electric drive motor 54 is powered by a rechargeable battery and is controlled by the control switches 48 located on the tiller 47.

A seat assembly 60 is mounted to the rear frame section 30 of the personal mobility vehicle 5. The seat assembly 60 comprises a pedestal 62 mounted to the rear frame section 30 for rotatably supporting a seat 64. The seat 64 comprises a seat base 65 and a backrest 66. Preferably, the backrest 66 of the seat 64 is pivotably mounted to the seat base 65 for accommodating for the size and comfort of an operator. The seat 64 is rotatable on the pedestal 62 for accommodating for comfort of the operator and for facilitating the ingress and egress on and off of the personal mobility vehicle 5 by the operator.

In this embodiment of the invention, the variable wheelbase mechanism 10 comprises a slide mechanism 12 interconnecting the front wheel assembly 25 to the rear wheel assembly 35. A variable wheelbase drive 14 coacts between the front wheel assembly 25 and the rear wheel assembly 35 to vary the distance between the front wheel assembly 25 and the rear wheel assembly 35. The variable wheelbase drive 14 comprises an electric motor 16 for powering a slide actuator 18. As will be described in greater detail hereinafter, a rotation of the electric motor 16 results in a linear movement of the slide actuator 18.

FIGS. 1 and 2 illustrates the personal mobility vehicle 5 with the variable wheelbase mechanism 10 being disposed in a contracted position. The distance between the front axle 43 and the drive shaft 53 is moved by the variable wheelbase mechanism 10 to a minimal distance.

Figure 3:
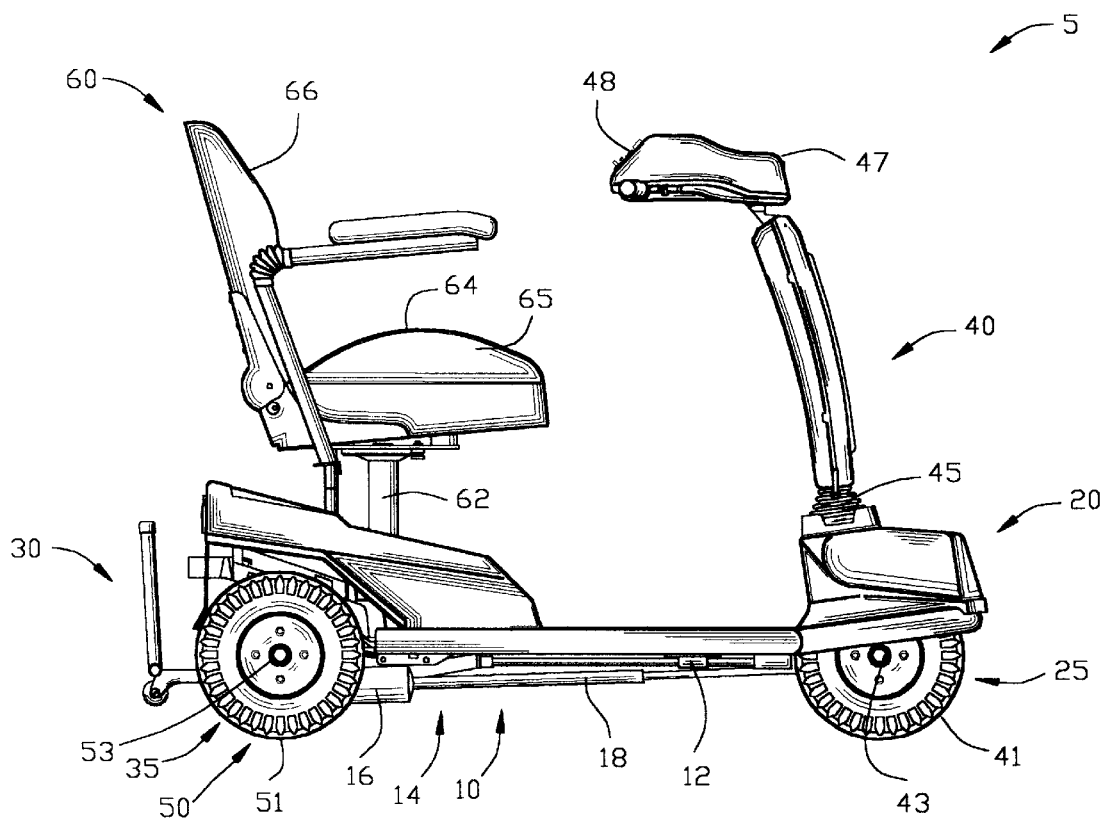
FIG. 3 is a side elevational view similar to FIG. 1 with the variable wheelbase being positioned in an extended position.
Figure 4:
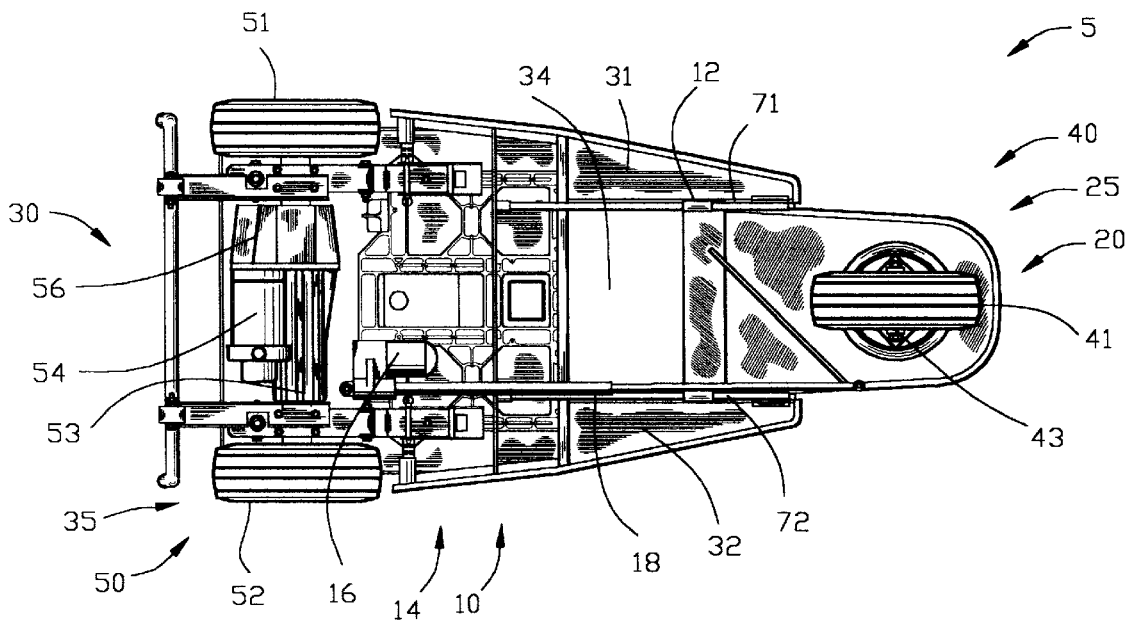
FIG. 4 is a bottom view of FIG. 3.

FIGS. 3 and 4 are side elevational and bottom views similar to FIGS. 1 and 2 with the variable wheelbase mechanism 10 being disposed in an extended position. The distance between the front axle 43 and the drive shaft 53 is moved by the variable wheelbase mechanism 10 to a maximum distance.

Figure 5:
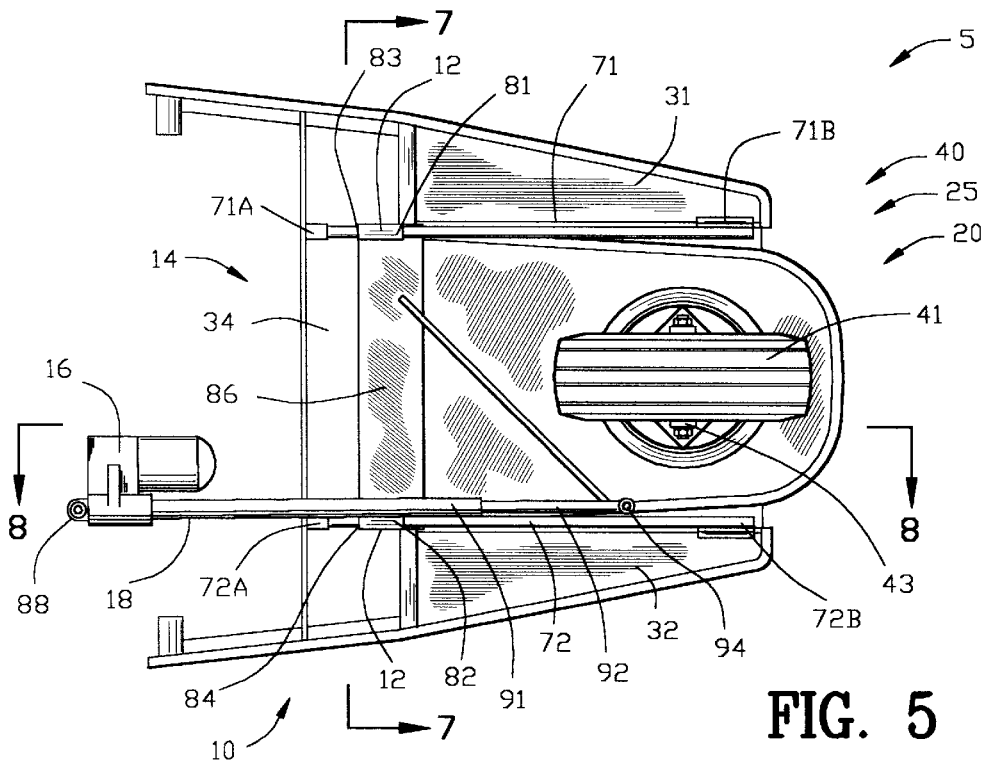
FIG. 5 is an enlarged view of a portion of FIG. 2.
Figure 6:
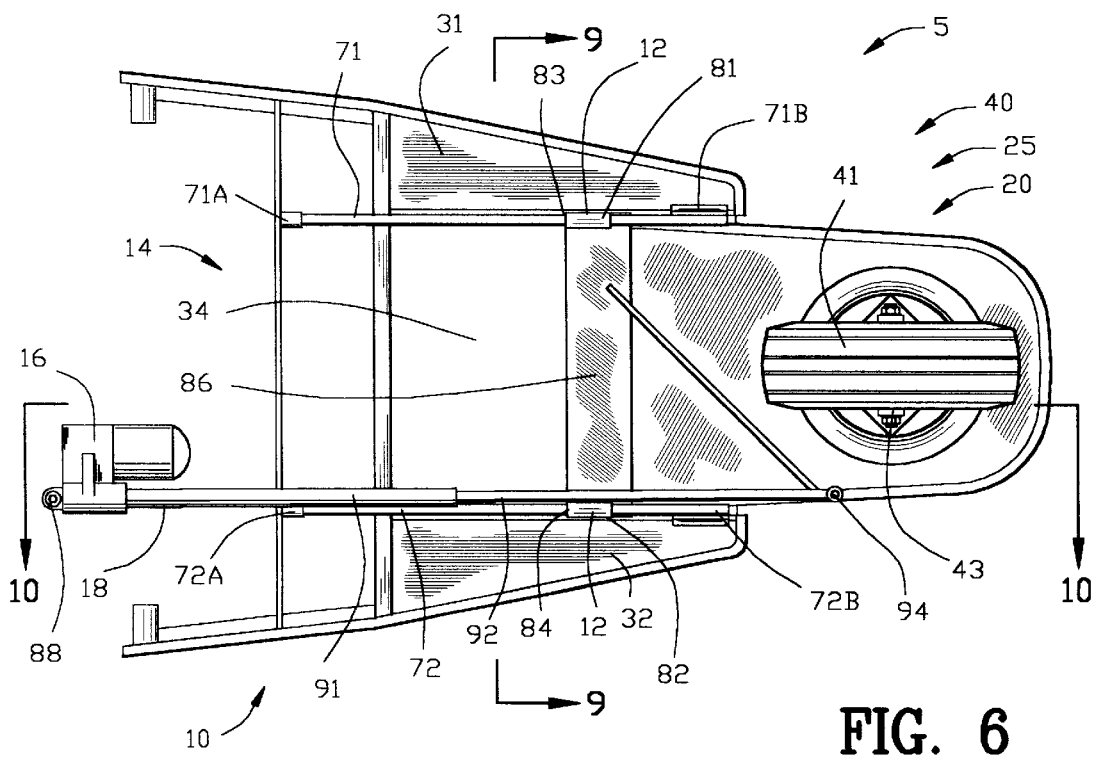
FIG. 6 is an enlarged view of a portion of FIG. 4.

FIGS. 5 and 6 are enlarged views of portions of FIGS. 2 and 4 illustrating the variable wheelbase mechanism 10 in the contracted position and in the extended position, respectively. In this example of the invention, the personal mobility vehicle 5 includes plural extensions 31 and 32 defining a void 34 therebetween.

Figure 7:
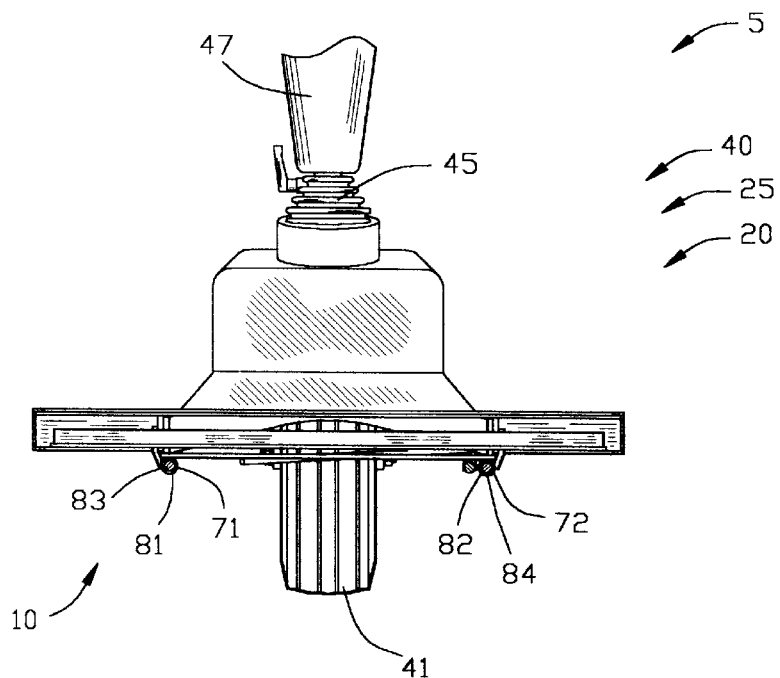
FIG. 7 is a sectional view along line 7—7 in FIG. 5.
Figure 8:
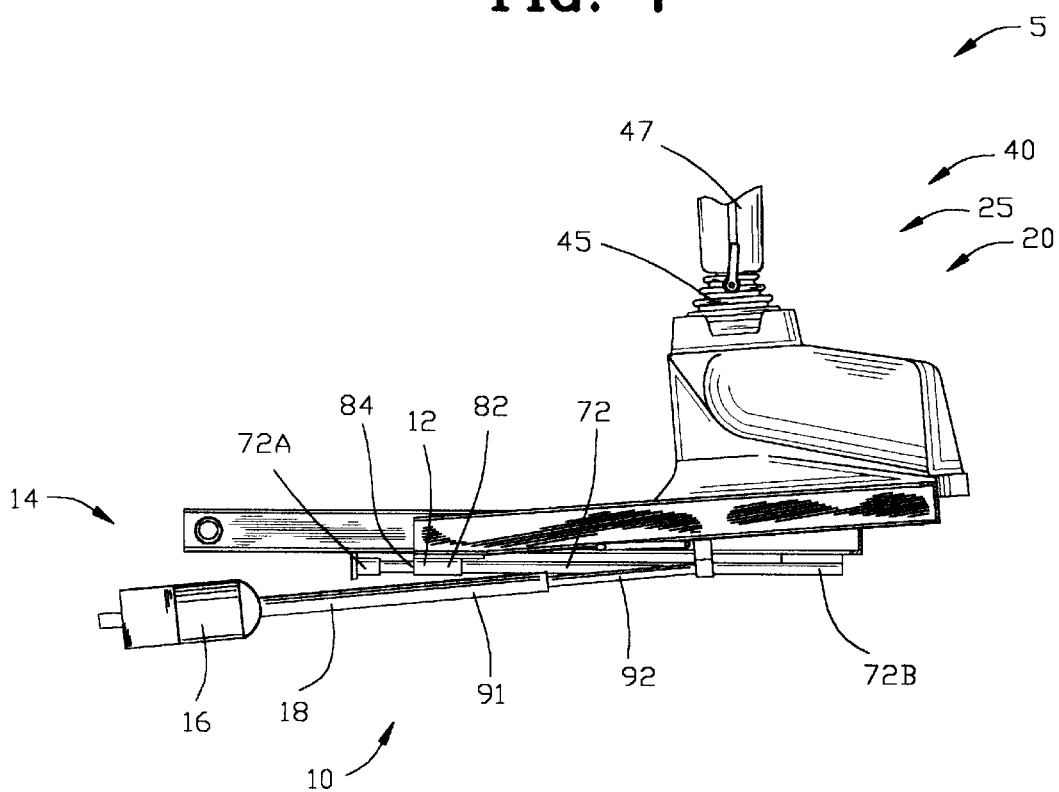
FIG. 8 is a sectional view along line 8—8 in FIG. 5.
Figure 9:
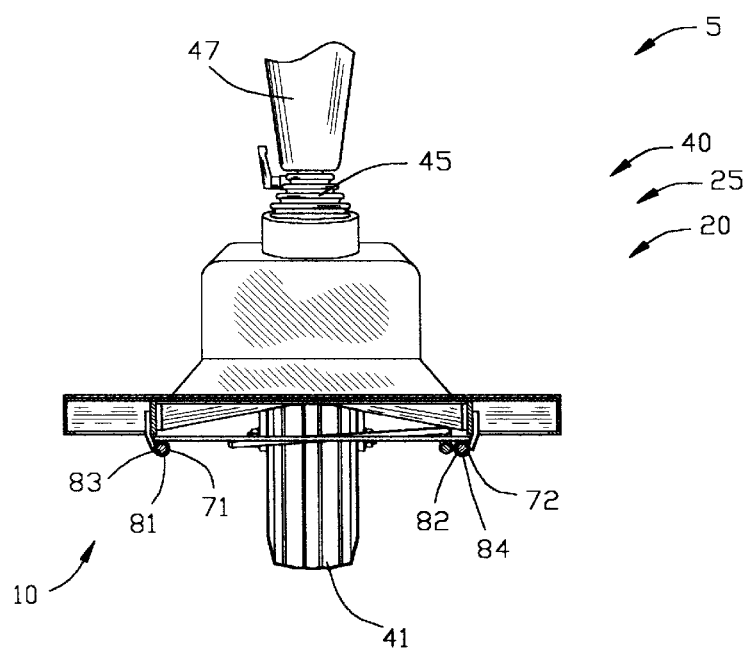
FIG. 9 is a sectional view along line 9—9 in FIG. 6.
Figure 10:
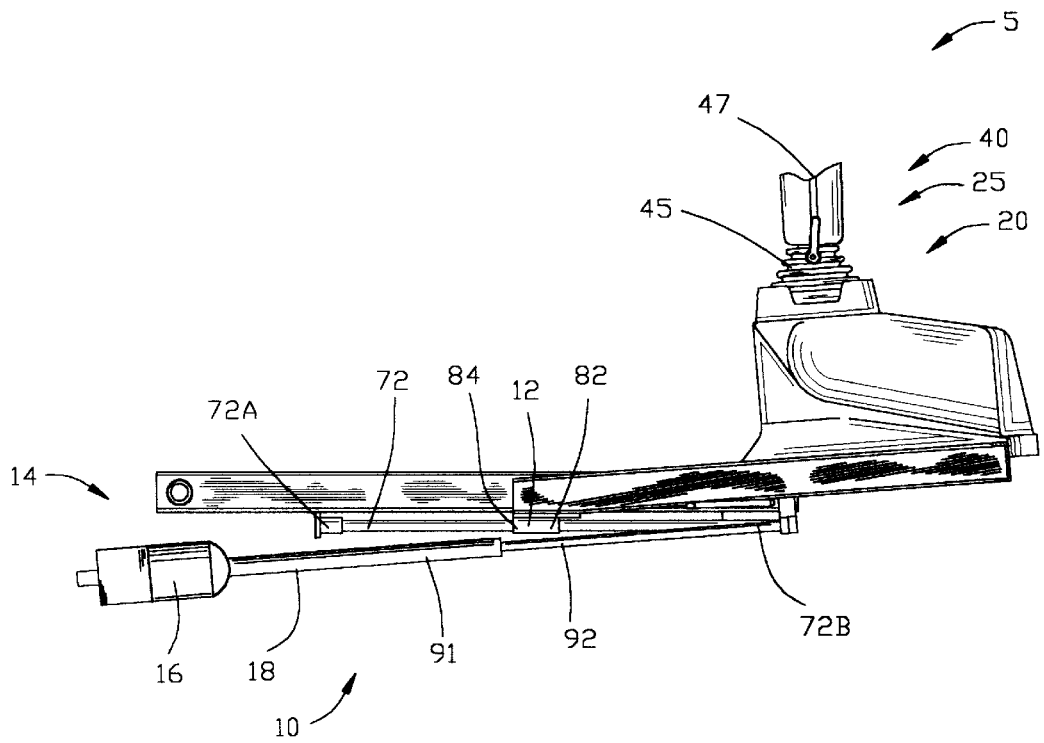
FIG. 10 is a sectional view along line 10—10 in FIG. 6.

FIGS. 7 and 8 are sectional views of FIG. 5 whereas FIGS. 9 and 10 are sectional views of FIG. 6. The slide mechanism 12 comprises plural shafts 71 and 72 secured relative to the rear wheel assembly 35 in a substantially parallel relationship. The shafts 71 and 70 extend from proximal ends 71A and 72A to distal ends 71B and 72B. The proximal ends 71A and 72A are connected relative to the rear wheel assembly 35 whereas the distal ends 71B and 72B are connected to the plural extensions 31 and 32. The shafts 71 and 70 extend along the void 34 defined by the plural extensions 31 and 32.

The slide mechanism 12 comprises plural shaft receivers shown as plural sleeves 81 and 82. The plural sleeves 81 and 82 define bores 83 and 84 for receiving the shafts 71 and 72 therein. The sleeves 81 and 82 are interconnected by a connecting support 86 for aligning the plural sleeves 81 and 82 in a substantially parallel relationship. The connecting support 86 is secured to the front wheel assembly 25.

The slide mechanism 12 interconnects the front wheel assembly 25 to the rear wheel assembly 35 in a sliding engagement. The sliding of the plural sleeves 81 and 82 along the shafts 71 and 72 provides the sliding interconnection between the front wheel assembly 25 and the rear wheel assembly 35. The sliding interconnection between the front wheel assembly 25 and the rear wheel assembly 35 provides a variable separation between the front wheel assembly 25 to the rear wheel assembly 35.

The variable wheelbase drive 14 comprises an electric motor 16 having a mounting aperture 88 for securing the electric motor 16 to the rear wheel assembly 35. The slide actuator 18 comprises a first actuator portion 91 and a second actuator portion 92. The first actuator portion 91 is connected to the electric motor 16. The second actuator portion 92 is connected by an aperture 94 to the front wheel assembly 25. The second actuator portion 92 is linearly movable relative to the first actuator portion 91 upon rotation of the electric motor 16. The rotation of the motor 16 results in linear movement of the second actuator portion 92 relative to the first actuator portion 91 to move the front wheel assembly 25 relative to the rear wheel assembly 35 upon the slide mechanism 12.

Figure 11:
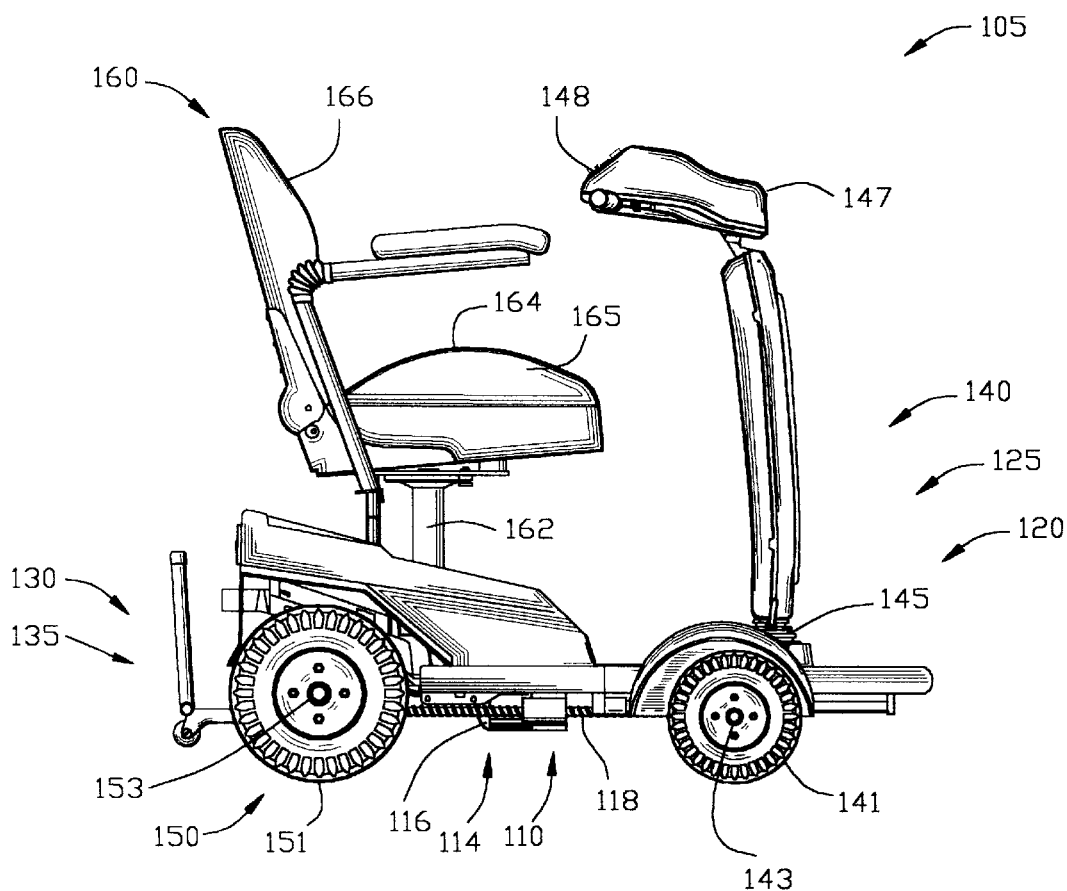
FIG. 11 is a side elevational view of a second embodiment of a variable wheelbase personal mobility vehicle incorporating the present invention with the variable wheelbase being positioned in a contracted position.
Figure 12:
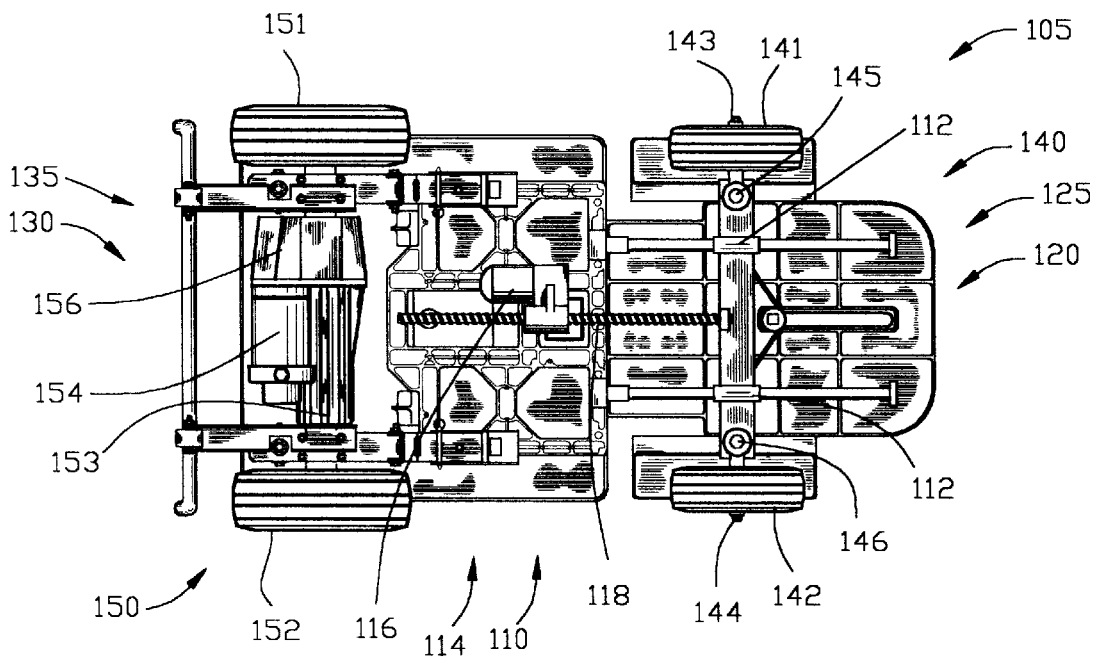
FIG. 12 is a bottom view of FIG. 11.

FIGS. 11 and 12 are side and bottom views of a second embodiment of a personal mobility vehicle 105 comprising a front frame section 120 and the rear frame section 130. The front frame section 120 comprises a front wheel assembly 125 whereas the rear frame section 130 comprises a rear wheel assembly 135. The variable wheelbase mechanism 110 interconnects the front wheel assembly 125 to the rear wheel assembly 135.

A steering mechanism 140 is connected to the front wheel assembly 125. The steering mechanism 140 comprises plural front wheels 141 and 142 mounted on plural axles 143 and 144. The plural front axles 143 and 144 are pivotably mounted relative to the front wheel assembly 125 by plural pivots 145 and 146. A tiller 147 is connected to the plural pivots 145 and 146 for enabling an operator to pivot the plural front wheels 141 and 142. Control switches 148 are conveniently located on the tiller 147 for enabling an operator to control the speed and the rotational direction of the personal mobility vehicle 105.

A drive unit 150 is connected to the rear wheel assembly 135. The drive unit 150 comprises plural drive wheels 151 and 152 mounted on a drive shaft 153. An electric drive motor 154 is connected through a gearbox 156 for driving the plural drive wheels 151 and 152 through the drive shaft 153 and the gearbox 156. The electric drive motor 154 is powered by a rechargeable battery and is controlled by the control switches 148 located on the tiller 147.

A seat assembly 160 is mounted to the rear frame section 130 of the personal mobility vehicle 105. The seat assembly 160 comprises a pedestal 162 mounted to the rear frame section 130 for rotatably supporting a seat 164. The seat 164 comprises a seat base 165 and a backrest 166 and is rotatable on the pedestal 162 as set forth previously.

The variable wheelbase mechanism 110 comprises a slide mechanism 112 interconnecting the front wheel assembly 125 to the rear wheel assembly 135. A variable wheelbase drive 114 coacts between the front wheel assembly 125 and the rear wheel assembly 135 to vary the distance between the front wheel assembly 125 and the rear wheel assembly 135. The variable wheelbase drive 114 comprises an electric motor 116 for powering a slide actuator 118.

FIGS. 11 and 12 illustrates the personal mobility vehicle 105 with the variable wheelbase mechanism 110 being disposed in a contracted position. The distance between the front axles 143 and 144 and the drive shaft 153 is moved by the variable wheelbase mechanism 110 to a minimal distance.

Figure 13:
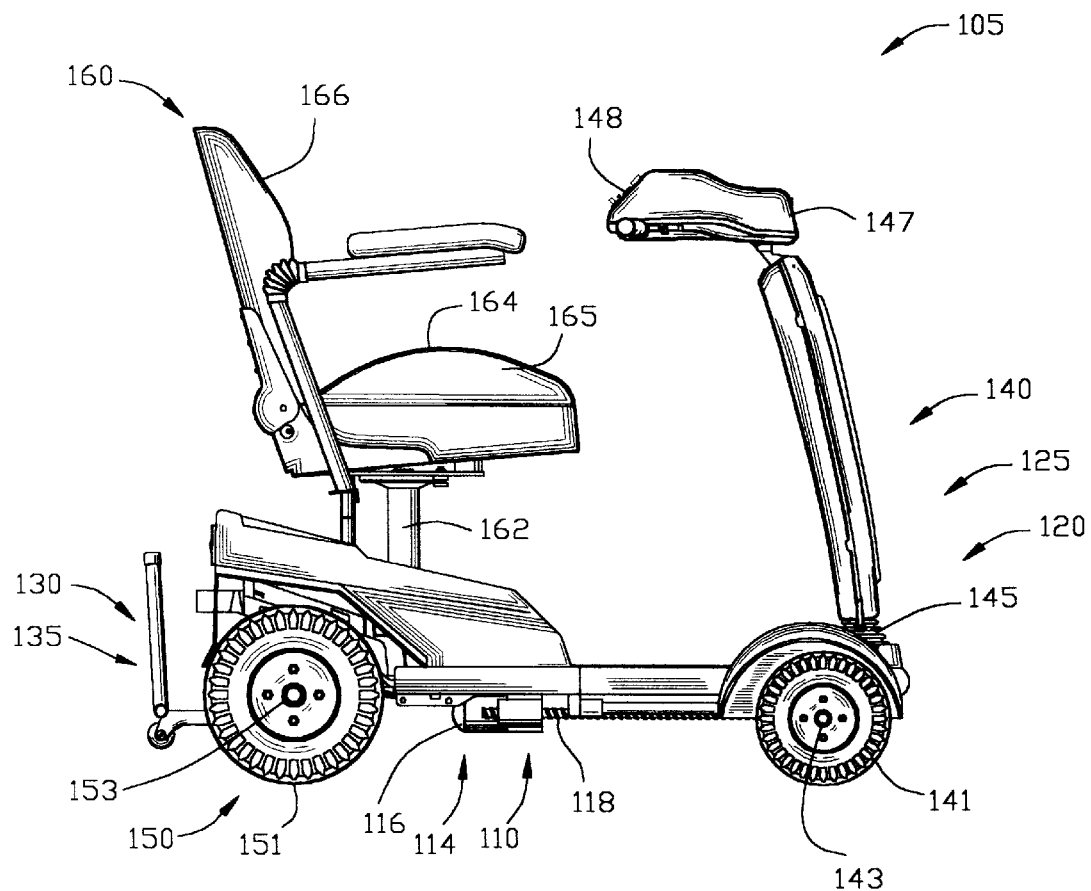
FIG. 13 is a side elevational view similar to FIG. 11 with the variable wheelbase being positioned in an extended position.
Figure 14:
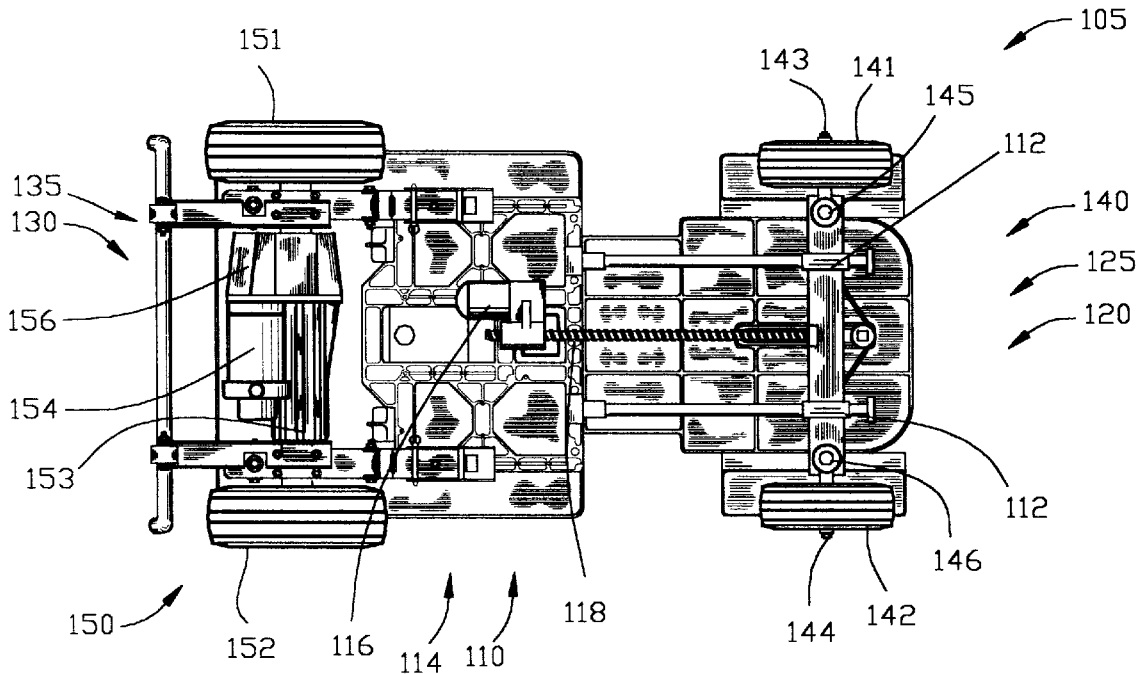
FIG. 14 is a bottom view of FIG. 13.

FIGS. 13 and 14 are side elevational and bottom views similar to FIGS. 11 and 12 with the variable wheelbase mechanism 110 being disposed in an extended position. The distance between the front axles 143 and 144 and the drive shaft 153 is moved by the variable wheelbase mechanism 110 to a maximum distance.

Figure 15:
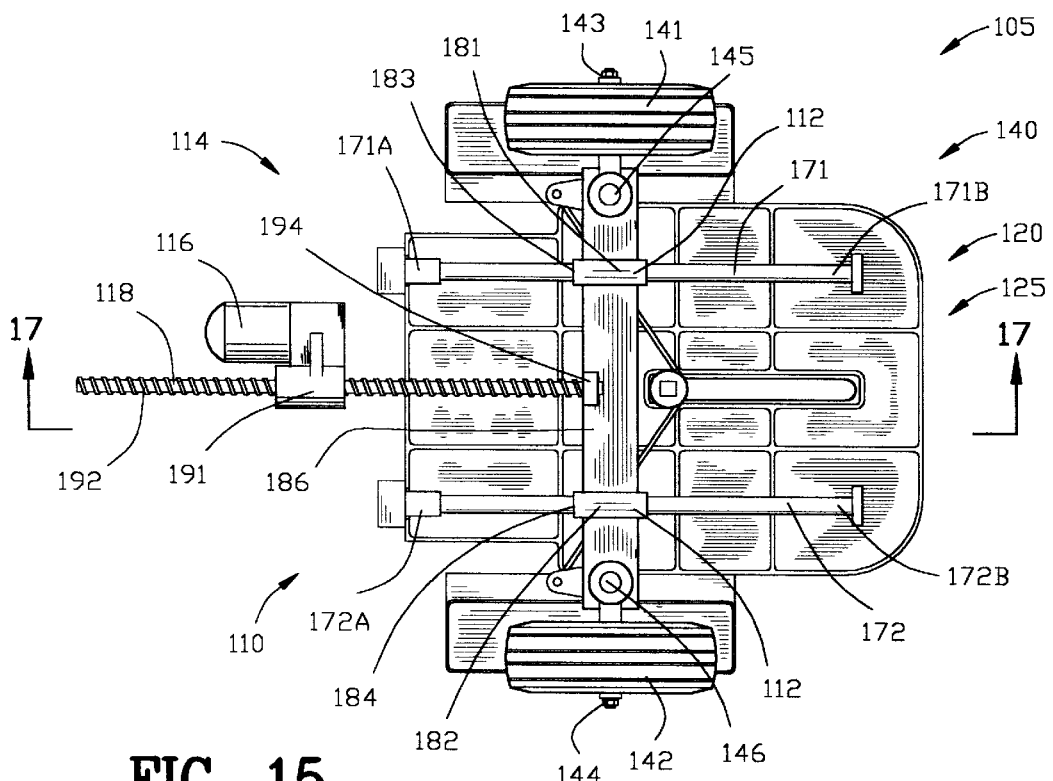
FIG. 15 is an enlarged view of a portion of FIG. 12.
Figure 16:
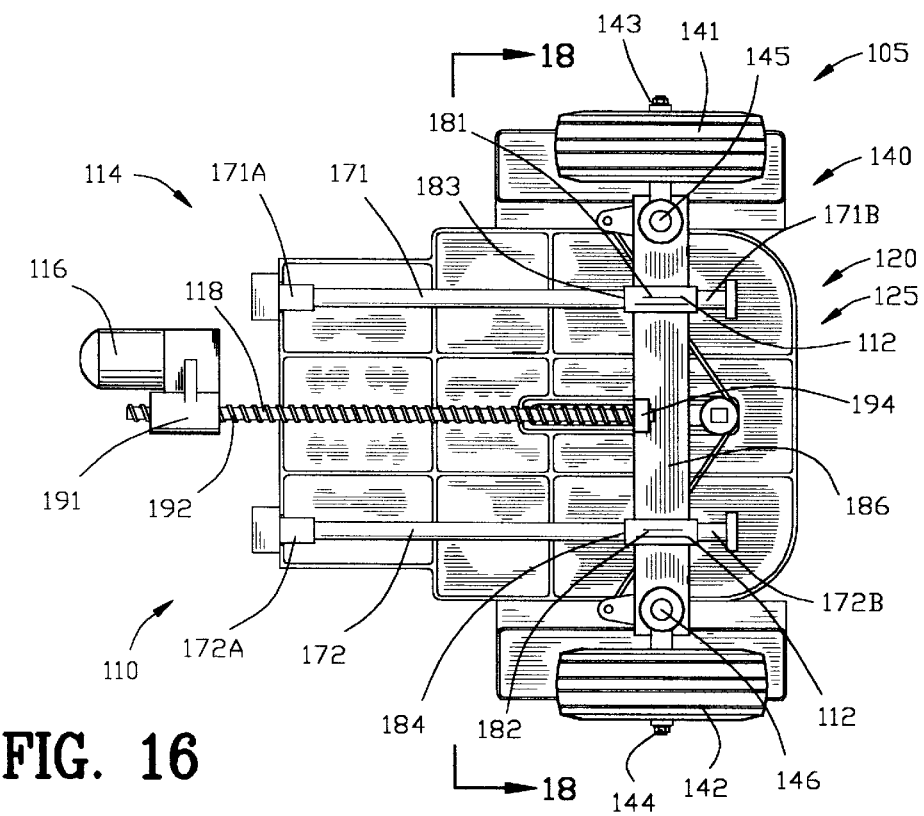
FIG. 16 is an enlarged view of a portion of FIG. 14.
Figure 17:
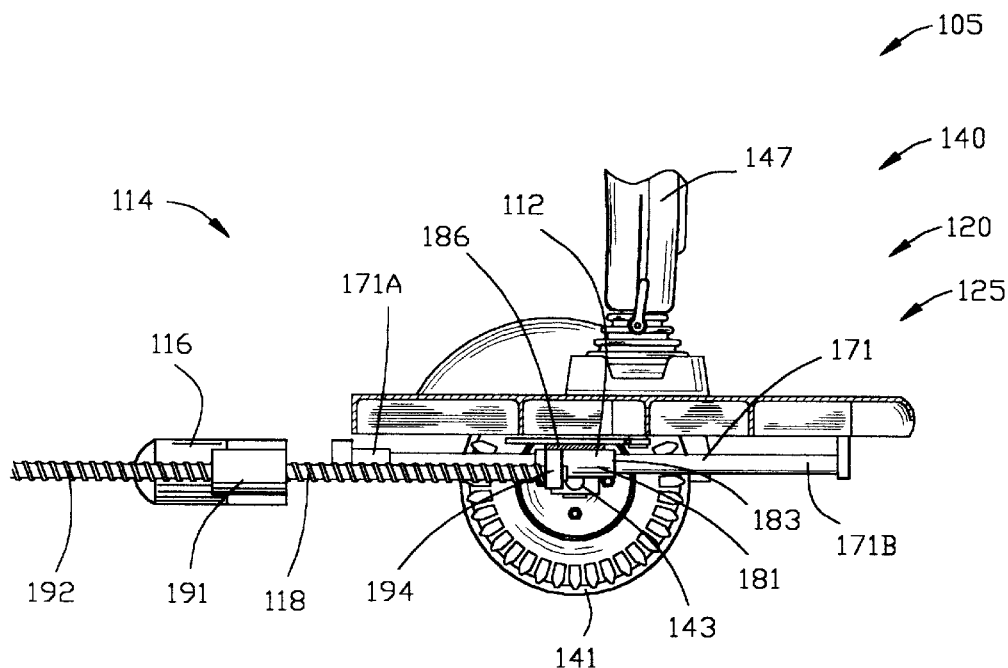
FIG. 17 is a sectional view along line 17—17 in FIG. 15.
Figure 18:
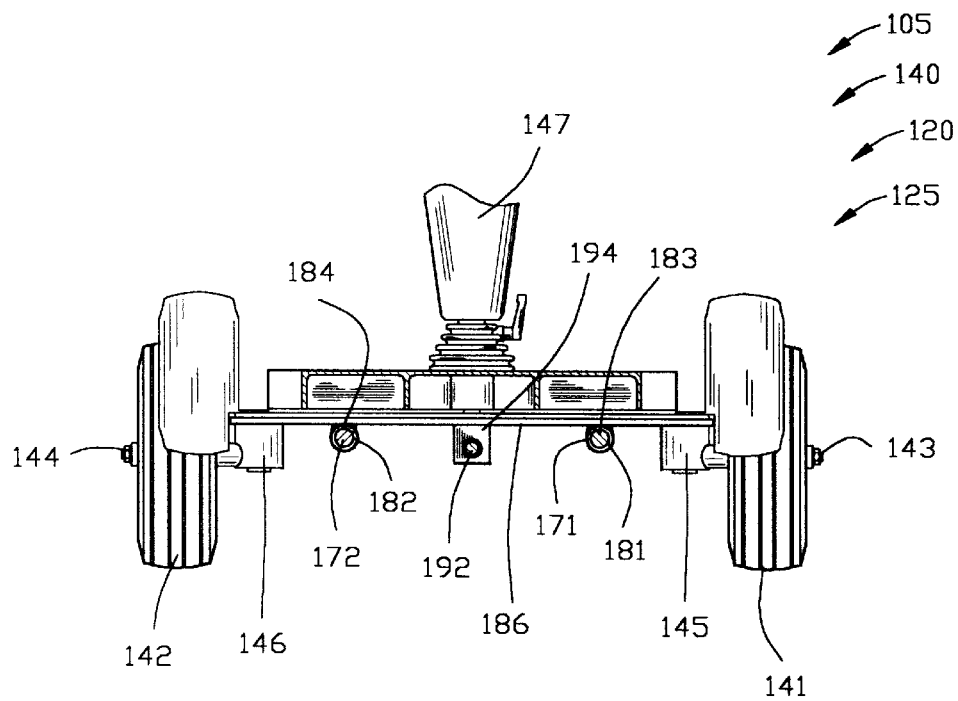
FIG. 18 is a sectional view along line 18—18 in FIG. 16.

FIGS. 15 and 17 are enlarged views of portions of FIG. 12 illustrating the variable wheelbase mechanism 110 in the contracted position whereas FIGS. 16 and 18 are enlarged views of portions of FIG. 14 illustrating the variable wheelbase mechanism 110 in the extended position.

The slide mechanism 112 comprises plural shafts 171 and 172 secured to the rear wheel assembly 135 in a substantially parallel relationship. The shafts 171 and 172 extend from proximal ends 171A and 172A to distal ends 171B and 172B. The proximal ends 171A and 172A are connected relative to the rear wheel assembly 135 whereas the distal ends 171B and 172B extend relative to the rear wheel assembly 135.

The slide mechanism 112 comprises plural shaft receivers shown as plural sleeves 181 and 182 defining bores 183 and 184 for receiving the shafts 171 and 172 therein. The sleeves 181 and 182 are interconnected by a connecting support 186 for aligning the plural sleeves 181 and 182 in a substantially parallel relationship. The connecting support 186 is secured to the front wheel assembly 125.

The slide mechanism 112 interconnects the front wheel assembly 125 to the rear wheel assembly 135 in a sliding engagement. The sliding of the plural sleeves 181 and 182 along the shafts 171 and 172 provides the sliding interconnection between the front wheel assembly 125 and the rear wheel assembly 135. The sliding interconnection between the front wheel assembly 125 and the rear wheel assembly 135 provides a variable separation between the front wheel assembly 125 to the rear wheel assembly 135.

In this first example of the second embodiment of the invention, the variable wheelbase drive 114 comprises an electric motor 116 secured to the rear wheel assembly 135. The slide actuator 118 comprises a first actuator portion 191 and a second actuator portion 192. The first actuator portion 191 is connected to the electric motor 116. The second actuator portion 192 is connected at 194 to the front wheel assembly 125.

The first actuator portion 191 comprises a thread driver whereas the second actuator portion 192 comprises a threaded shaft. The thread driver 191 is powered by the electric motor 116. The threaded shaft 192 engages with the thread driver 191 for linearly moving the threaded shaft 192 upon rotation of the electric motor 116. The rotation of the motor 116 results in linear movement of the second actuator portion 192 relative to the first actuator portion 191 to move the front wheel assembly 125 relative to the rear wheel assembly 135 upon the slide mechanism 112.

In the first embodiment of the invention shown in FIGS. 1–10, the front wheel assembly 25 comprises a single front wheel 41 being movable relative to the rear wheel assembly 35 comprising plural rear wheels 51 and 52. The front wheel assembly 25 comprises only a portion of the frame section 20 of the personal mobility vehicle 5. The front frame section 20 may be removably coupled to the rear frame section 30 as set forth in U.S. Pat. No. 4,909,525 to Michael Flowers.

In the second embodiment of the invention shown in FIGS. 11–18, the front wheel assembly 125 comprises plural front wheels 141 and 142 being movable relative to the rear wheel assembly 135 comprising plural rear wheels 151 and 152. The front wheel assembly 125 comprises only a portion of the front frame section 120 of the personal mobility vehicle 105. The front frame section 120 may be removably coupled to the rear frame portion 130 as set forth in U.S. Pat. No. 4,909,525 to Michael Flowers.

The second embodiment of the invention shown in FIGS. 11–18, enables the front wheel assembly 125 comprising plural front wheels 141 and 142 to be removed for ease of transportation of the personal mobility vehicle 105. The personal mobility vehicle 105 may be readily dissembled into the front frame section 120, the rear frame portion 130 and the front wheel assembly 125.

The second embodiment of the invention shown in FIGS. 11–18, enables the front wheel assembly 125 comprising plural front wheels 141 and 142 to be removed and to be replaced with a front wheel assembly comprising a single front wheel (not shown) in a manner similar to the front wheels assembly 25 of FIGS. 1–10. The personal mobility vehicle 105 may be operated with either a single front wheel or plural front wheels with a variable wheelbase.

Figure 19:
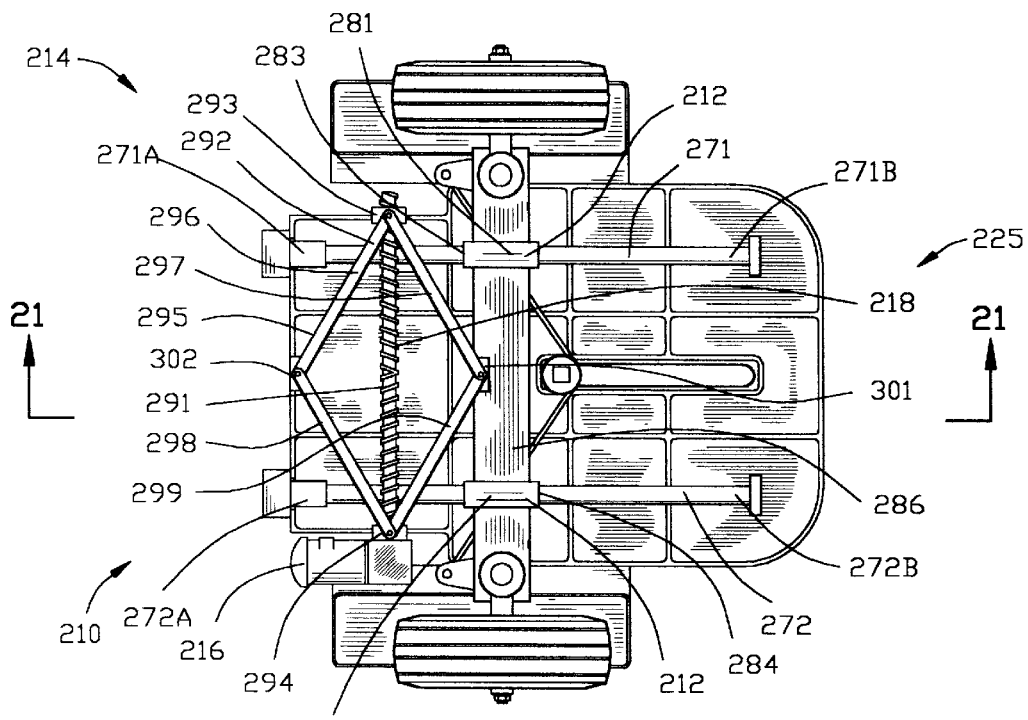
FIG. 19 is an enlarged view of a portion of FIG. 12 illustrating a first variation of the variable wheelbase drive.
Figure 21:
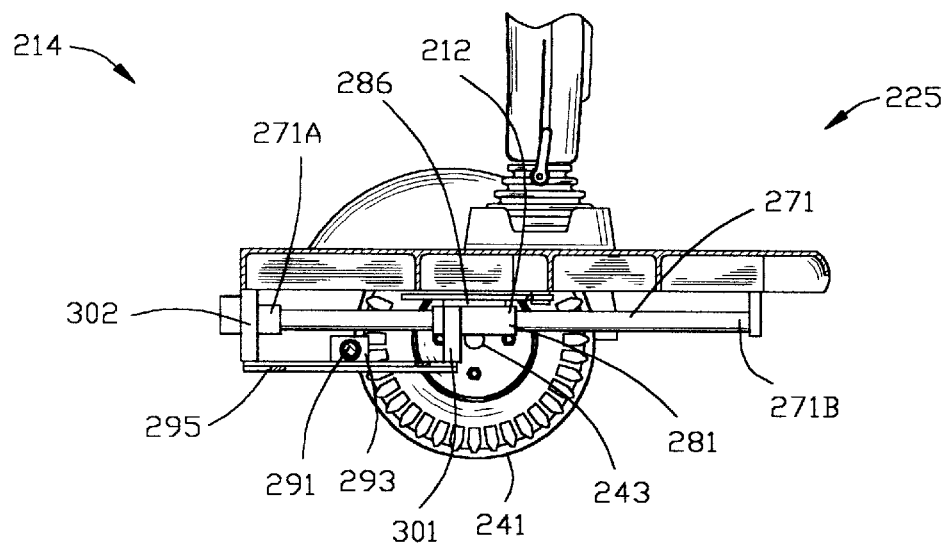
FIG. 21 is a sectional view along line 21—21 in FIG. 19.

FIGS. 19 and 21 are enlarged views of portions of FIG. 12 illustrating a second example of a variable wheelbase mechanism 210 in the contracted position. A slide mechanism 212 comprising plural shafts 271 and 272 are secured to the rear wheel assembly 135 in a substantially parallel relationship in a manner similar to FIGS. 12–18. The proximal ends 271A and 272A of the plural shafts 271 and 272 are connected to the rear wheel assembly 135 with the distal ends 271B and 272B extending therefrom.

Figure 20:
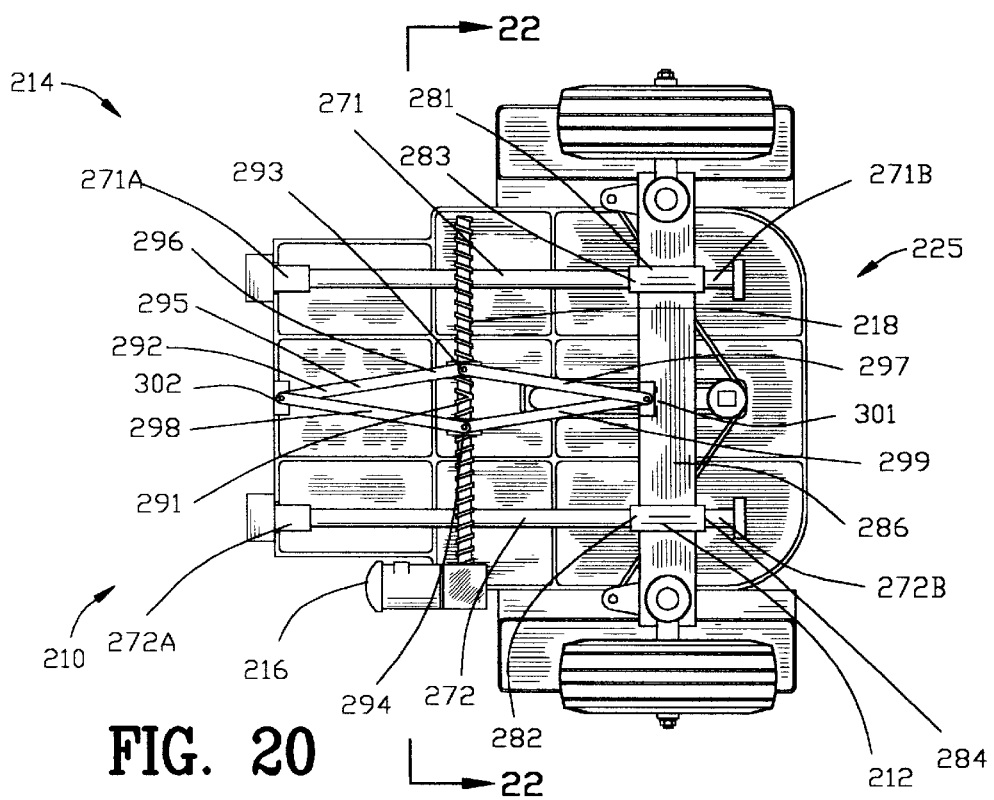
FIG. 20 is an enlarged view of a portion of FIG. 14 illustrating the first variation of the variable wheelbase drive shown in FIG. 19.
Figure 22:
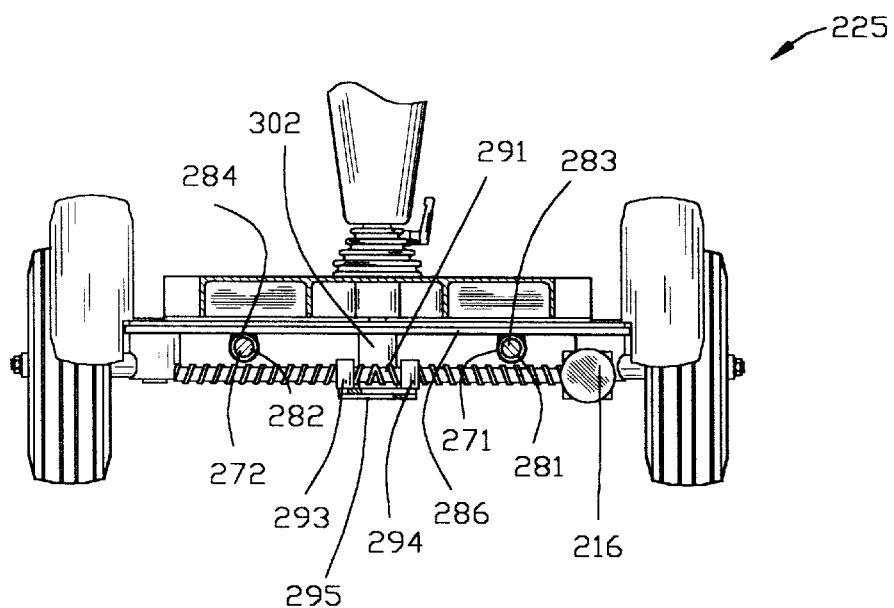
FIG. 22 is a sectional view along line 22—22 in FIG. 20.

FIGS. 20 and 22 are enlarged views of portions of FIG. 14 illustrating the second example of a variable wheelbase mechanism 210 in an extended position. Plural sleeves 281 and 282 interconnected by a connecting support 286 define bores 283 and 284 for receiving the shafts 271 and 272 therein. The connecting support 286 is secured to the front wheel assembly 225 for interconnecting the front wheel assembly 225 to the rear wheel assembly 135 in a sliding engagement to provide a variable separation between the front wheel assembly 225 to the rear wheel assembly 135.

In this second example of the second embodiment of the invention, the variable wheelbase drive 214 comprises an electric motor 216 secured to the rear wheel assembly 135. The slide actuator 218 comprises a first actuator portion 291 and a second actuator portion 292. The first actuator portion 291 is connected to the electric motor 216. The second actuator portion 292 interconnects the front wheel assembly 225 to the rear wheel assembly 135.

The first actuator portion 291 comprises a threaded shaft whereas the second actuator portion 292 comprises plurals nuts 293 and 294 connected to a scissors jack 295. The scissors jack 295 comprises a plurality of legs 296–299 interconnecting the plurals nuts 293 and 294 and interconnecting a front and a rear connector 301 and 302. The front and rear connectors 301 and 302 are secured to the front wheel assembly 225 and to the rear wheel assembly 135 for interconnecting the front wheel assembly 225 to the rear wheel assembly 135.

The threaded shaft 291 is powered by the electric motor 216. The threaded shaft 291 engages with the plurals nuts 293 and 294. The rotation of the motor 216 results in a change of spacing between the plural nuts 293 and 294. The change of spacing between the plural nuts 293 and 294 changes the spacing between the front and rear connector 301 and 302 to move the front wheel assembly 225 relative to the rear wheel assembly 135 upon the slide mechanism 212.

Figure 23:
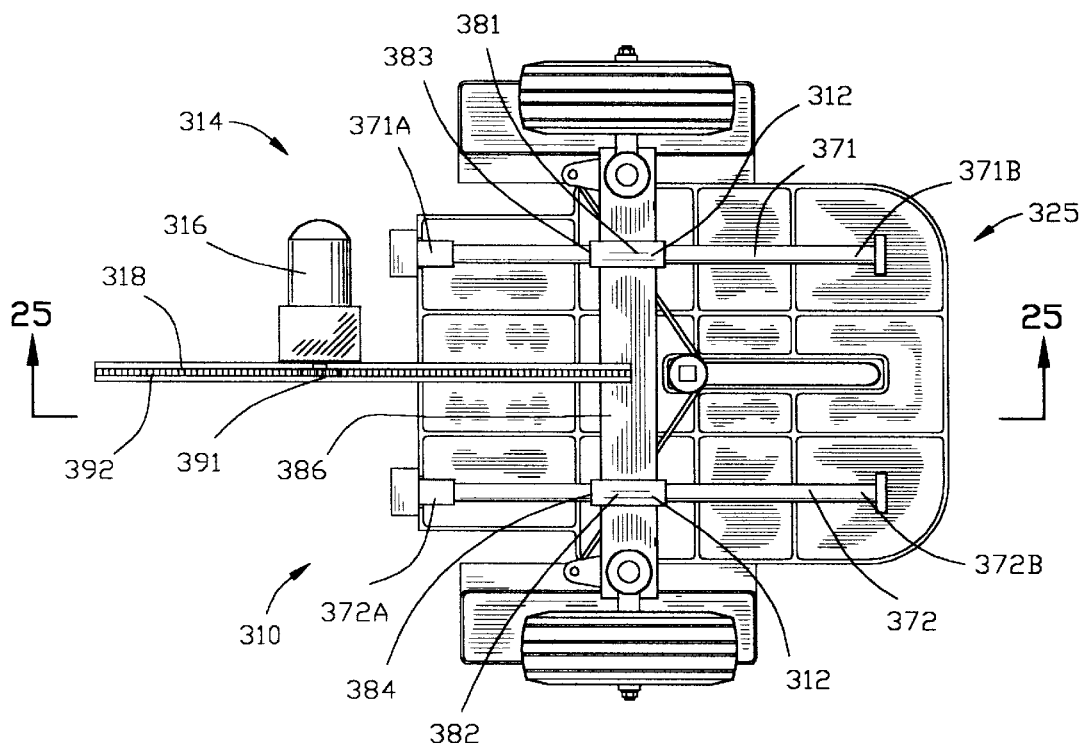
FIG. 23 is an enlarged view of a portion of FIG. 12 illustrating a second variation of the variable wheelbase drive.
Figure 25:
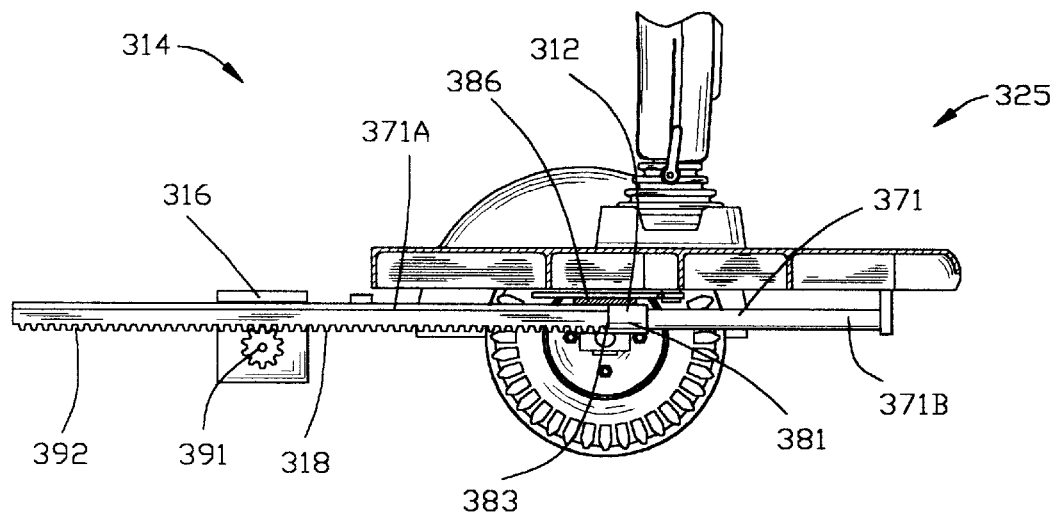
FIG. 25 is a sectional view along line 25—25 in FIG. 23.

FIGS. 23 and 25 are enlarged views of portions of FIG. 12 illustrating a third example of a variable wheelbase mechanism 310 in the contracted position. A slide mechanism 312 comprising plural shafts 371 and 372 are secured to the rear wheel assembly 135 in a substantially parallel relationship in a manner similar to FIGS. 12–18. The proximal ends 371A and 372A of the plural shafts 371 and 372 are connected to the rear wheel assembly 135 with the distal ends 371B and 372B extending therefrom.

Figure 24:
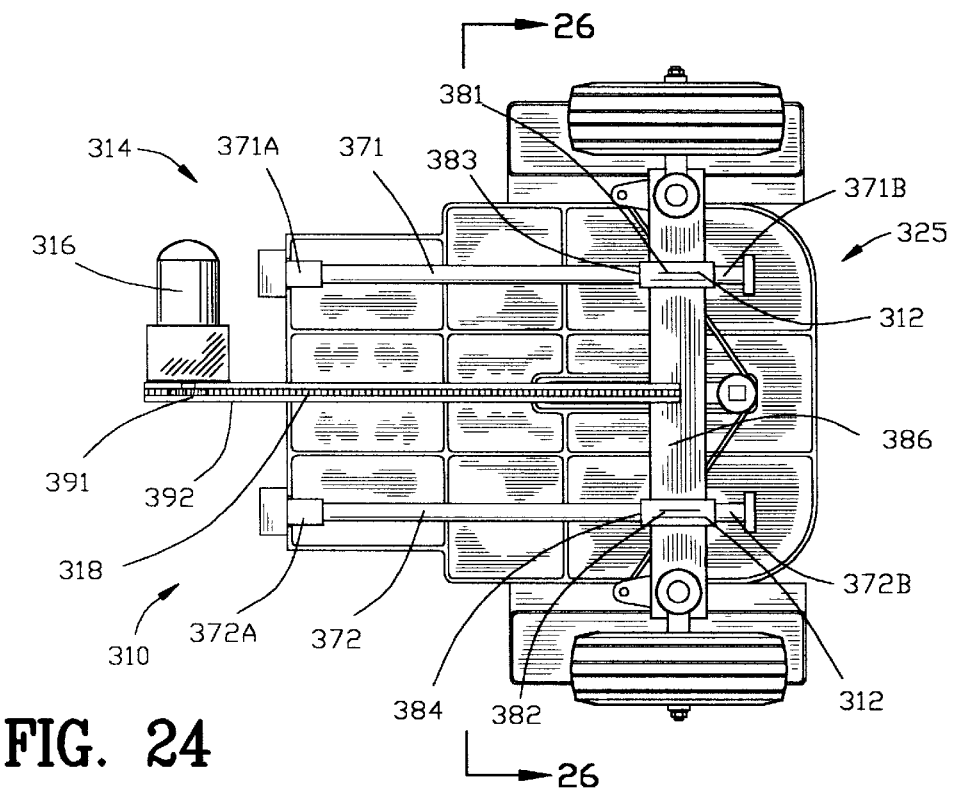
FIG. 24 is an enlarged view of a portion of FIG. 14 illustrating the second variation of the variable wheelbase drive shown in FIG. 23.
Figure 26:
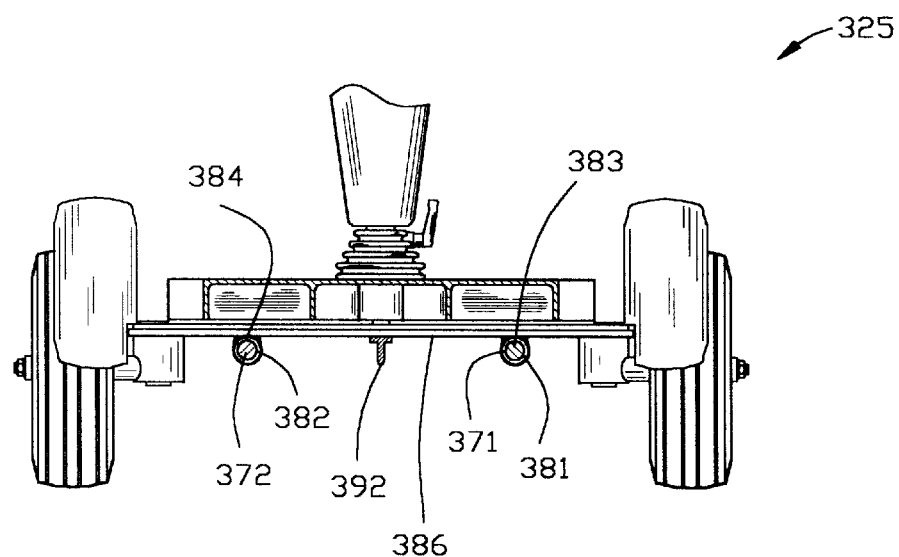
FIG. 26 is a sectional view along line 26—26 in FIG. 24.

FIGS. 24 and 26 are enlarged views of portions of FIG. 14 illustrating the third example of a variable wheelbase mechanism 310 in an extended position. Plural sleeves 381 and 382 interconnected by a connecting support 386 define bores 383 and 384 for receiving the shafts 371 and 372 therein. The connecting support 386 is secured to the front wheel assembly 325 for interconnecting the front wheel assembly 325 to the rear wheel assembly 135 in a sliding engagement to provide a variable separation between the front wheel assembly 325 to the rear wheel assembly 135.

In this third example of the second embodiment of the invention, the variable wheelbase drive 314 comprises an electric motor 316 secured to the rear wheel assembly 135. The slide actuator 318 comprises a first actuator portion 391 and a second actuator portion 392. The first actuator portion 391 is connected to the electric motor 316. The second actuator portion 392 is connected to the front wheel assembly 325.

The first actuator portion 391 comprises a pinion gear whereas the second actuator portion 392 comprises a rack. The pinion gear 391 is powered by the electric motor 316. The rack 392 engages with the pinion gear 391 for linearly moving the rack 392 upon rotation of the electric motor 316. The rotation of the motor 316 results in linear movement of the second actuator portion 392 relative to the first actuator portion 391 to move the front wheel assembly 325 relative to the rear wheel assembly 135 upon the slide mechanism 312.

Figure 27:
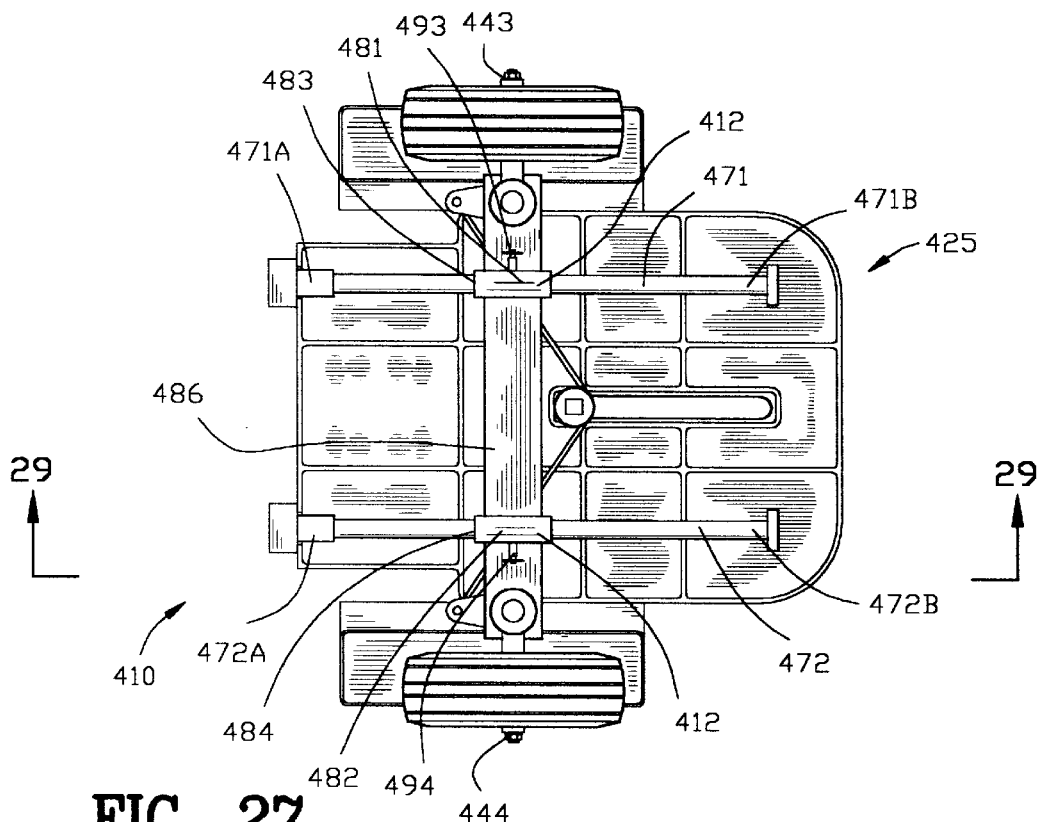
FIG. 27 is an enlarged view of a portion of FIG. 12 illustrating a third variation of the variable wheelbase drive.
Figure 29:
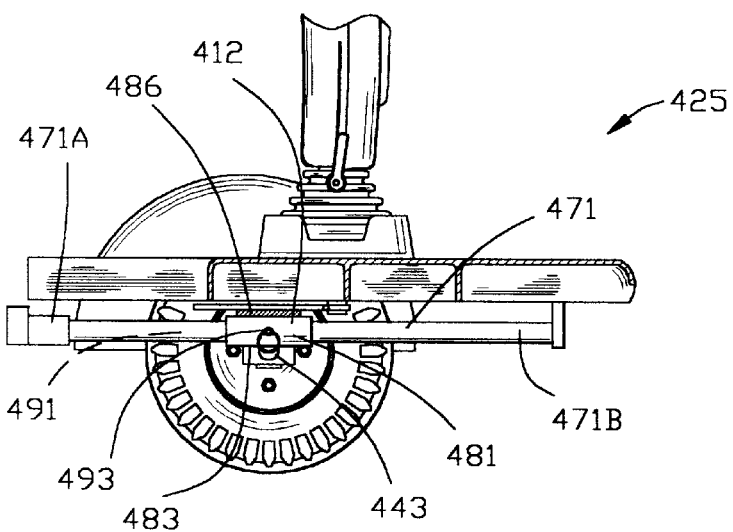
FIG. 29 is a sectional view along line 29—29 in FIG. 27.

FIGS. 27 and 29 are enlarged views of portions of FIG. 12 illustrating a fourth example of a variable wheelbase mechanism 410 in the contracted position. A slide mechanism 412 comprising plural shafts 471 and 472 are secured to the rear wheel assembly 135 in a substantially parallel relationship in a manner similar to FIGS. 12–18. The proximal ends 471A and 472A of the plural shafts 471 and 472 are connected to the rear wheel assembly 135 with the distal ends 471B and 472B extending therefrom.

Figure 28:
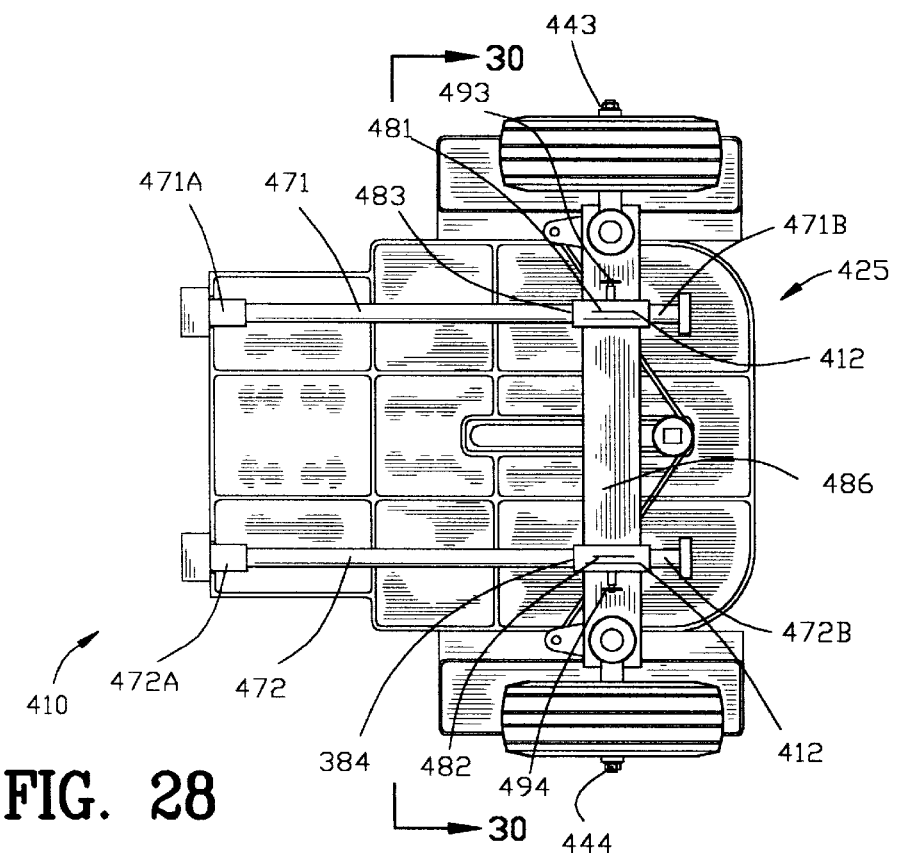
FIG. 28 is an enlarged view of a portion of FIG. 14 illustrating the third variation of the variable wheelbase drive shown in FIG. 27.
Figure 30:
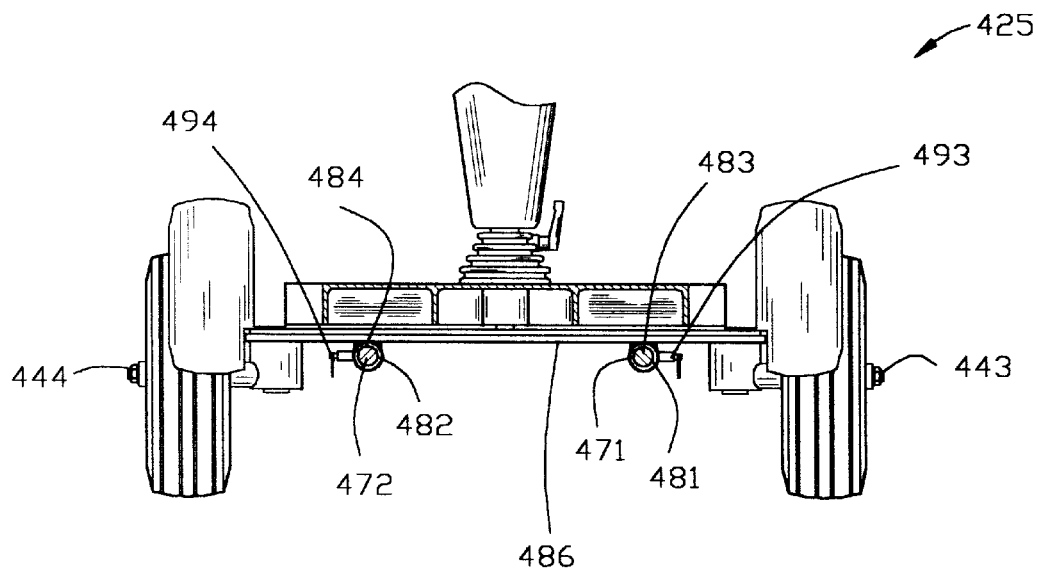
FIG. 30 is a sectional view along line 30—30 in FIG. 28.

FIGS. 28 and 30 are enlarged views of portions of FIG. 14 illustrating the fourth example of a variable wheelbase mechanism 410 in an extended position. Plural sleeves 481 and 482 interconnected by a connecting support 486 define bores 483 and 484 for receiving the shafts 471 and 472 therein. The connecting support 486 is secured to the front wheel assembly 425 for interconnecting the front wheel assembly 425 to the rear wheel assembly 135 in a sliding engagement to provide a variable separation between the front wheel assembly 425 to the rear wheel assembly 135.

In this fourth example of the second embodiment of the invention, the front wheel assembly 425 is manually moved relative to the rear wheel assembly 435. Each of the plural sleeves 481 and 482 comprise a sleeve aperture. Each of the plural shafts 471 and 472 define a plurality of through shaft apertures, respectively. Plural locking pins 493 and 494 extend through the sleeve apertures and the shaft apertures for locking the longitudinal position of the sleeves 481 and 482 on the plural shafts 471 and 472. The removal of the plural locking pins 493 and 494 allows the sleeves 481 and 482 to be moved along the plural shafts 471 and 472 for changing the longitudinal distance between the front axles 443 and 444 and the drive shaft 153.

The foregoing has set forth an improved personal mobility vehicle having a variable wheelbase mechanism for varying the distance between the front wheel and the plural rear wheels of the personal mobility vehicle. The improved variable wheelbase mechanism is adaptable to either a three-wheel or four-wheel personal mobility vehicle. The variable wheelbase mechanism may be either manually operated or power operated. The variable wheelbase mechanism does not substantially increase the weight of the personal mobility vehicle.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A variable wheelbase personal mobility vehicle, comprising:

a front wheel assembly and a rear wheel assembly;

a front wheel pivotably mounted relative to said front wheel assembly for controlling the direction of movement of said personal mobility vehicle;

plural drive wheels mounted relative to said rear wheel assembly for driving the personal mobility vehicle;

a seat connected to said rear wheel assembly for supporting an operator; and a variable wheelbase mechanism comprising a sleeve having a bore for slidably receiving a shaft extending between a proximal end and a distal end;

said sleeve being connected to one of said front and rear wheel assemblies; and said proximal and distal ends of said shaft being connected to the other of said front and rear wheel assemblies for varying the position of said front wheel assembly relative to said rear wheel assembly to vary the distance between said front wheel and said plural drive wheels.

2. A variable wheelbase personal mobility vehicle as set forth in claim 1, wherein said front wheel comprises one of plural front wheels pivotably mounted relative to said front wheel assembly for controlling the direction of movement of said personal mobility vehicle.

3. A variable wheelbase personal mobility vehicle as set forth in claim 1, wherein said variable wheelbase mechanism includes a lock for locking said distance between said front wheel and said front wheel and said plural drive wheels when said lock is in a closed condition and for enabling said distance between said front wheel and said plural drive wheels to be varied when said lock is in an open condition.

4. A variable wheelbase personal mobility vehicle as set forth in claim 1, wherein said variable wheelbase mechanism includes a variable wheelbase drive for moving said front wheel relative to said plural rear wheels for changing the wheelbase of the personal mobility vehicle.

5. A variable wheelbase personal mobility vehicle as set forth in claim 1, wherein said variable wheelbase mechanism includes a variable wheelbase drive for moving said front wheel relative to said plural rear wheels for changing the wheelbase of the personal mobility vehicle; and said variable wheelbase drive comprising a jackscrew.

6. A variable wheelbase personal mobility vehicle as set forth in claim 1, wherein said variable wheelbase mechanism includes a variable wheelbase drive for moving said front wheel relative to said plural rear wheels for changing the wheelbase of the personal mobility vehicle; and said variable wheelbase drive comprising a scissor jack.

7. A variable wheelbase personal mobility vehicle as set forth in claim 1, wherein said variable wheelbase mechanism includes a variable wheelbase drive for moving said front wheel relative to said plural rear wheels for changing the wheelbase of the personal mobility vehicle; and said variable wheelbase drive comprising a rack and pinion mechanism.

8. A variable wheelbase personal mobility vehicle as set forth in claim 1, wherein said sleeve and said shaft form a slide mechanism for varying the distance between said front wheel and said plurality of rear drive wheels.

9. A variable wheelbase personal mobility vehicle as set forth in claim 1, wherein said variable wheelbase mechanism comprises plural shafts with each of said plural shafts being mounted relative to one of said front and rear wheel assemblies;

plural sleeves with each of said plural sleeves defining a bore mounted relative to the other of said front and rear wheel assemblies; and said plural bores slidably receiving said plural shafts for slidably mounting said front wheel assembly relative to said rear wheel assembly.

10. A variable wheelbase personal mobility vehicle, comprising:

a front wheel assembly and a rear wheel assembly;

a front wheel pivotably mounted relative to said front wheel assembly for controlling the direction of movement of said personal mobility vehicle;

plural drive wheels mounted relative to said rear wheel assembly for driving the personal mobility vehicle;

a seat connected to said rear wheel assembly for supporting an operator; and a variable wheelbase mechanism comprising a sleeve having a bore for slidably receiving a shaft extending between a proximal end and a distal end;

said sleeve being connected to one of said front and rear wheel assemblies; and said proximal and distal ends of said shaft being connected to the other of said front and rear wheel assemblies for varying the position of said front wheel assembly relative to said rear wheel assembly to vary the distance between said front wheel and said plural drive wheels; and said variable wheelbase mechanism enabling said front wheel assembly to be removed from said rear wheel assembly for transportation of the variable wheelbase personal mobility vehicle.

11. A variable wheelbase personal mobility vehicle, comprising:

a front wheel assembly and a rear wheel assembly;

a front wheel pivotably mounted relative to said front wheel assembly for controlling the direction of movement of said personal mobility vehicle;

plural drive wheels mounted relative to said rear wheel assembly for driving the personal mobility vehicle;

a seat connected to said rear wheel assembly for supporting an operator; and a variable wheelbase mechanism comprising a sleeve having a bore for slidably receiving a shaft extending between a proximal end and a distal end;

said sleeve being connected to one of said front and rear wheel assemblies; and said proximal and distal ends of said shaft being connected to the other of said front and rear wheel assemblies for varying the position of said front wheel assembly relative to said rear wheel assembly to vary the distance between said front wheel and said plural drive wheels; and said variable wheelbase mechanism enabling said front wheel assembly to be removed from said rear wheel assembly for enabling a different front wheel assembly to be secured to said rear wheel assembly.

12. A variable wheelbase personal mobility vehicle, comprising:

a front wheel assembly and a rear wheel assembly;

a front wheel pivotably mounted relative to said front wheel assembly for controlling the direction of movement of said personal mobility vehicle;

plural drive wheels mounted relative to said rear wheel assembly for driving the personal mobility vehicle;

a seat connected to said rear wheel assembly for supporting an operator; and a variable wheelbase mechanism comprising plural sleeves having plural bores for slidably receiving plural shafts extending between proximal ends and distal ends, respectively;

said plural sleeves being connected to one of said front and rear wheel assemblies; and said proximal and distal ends of said plural shafts being connected to the other of said front and rear wheel assemblies for varying the position of said front wheel assembly relative to said rear wheel assembly to vary the distance between said front wheel and said plural drive wheels.

* * * * *